(12) United States Patent
Wanni et al.

(10) Patent No.: US 9,034,078 B2
(45) Date of Patent: May 19, 2015

(54) APPARATUS AND SYSTEMS HAVING AN ADSORBENT CONTACTOR AND SWING ADSORPTION PROCESSES RELATED THERETO

(71) Applicants: Amar S. Wanni, Fairfax, VA (US); Chithranjan Nadarajah, Mclean, VA (US); Jeffrey W. Frederick, Centreville, VA (US); Narasimhan Sundaram, Annandale, VA (US)

(72) Inventors: Amar S. Wanni, Fairfax, VA (US); Chithranjan Nadarajah, Mclean, VA (US); Jeffrey W. Frederick, Centreville, VA (US); Narasimhan Sundaram, Annandale, VA (US)

(73) Assignee: ExxonMobil Upstream Research Company, Houston, TX (US)

( * ) Notice: Subject to any disclaimer, the term of this patent is extended or adjusted under 35 U.S.C. 154(b) by 184 days.

(21) Appl. No.: 13/950,052

(22) Filed: Jul. 24, 2013

(65) Prior Publication Data
US 2014/0060322 A1    Mar. 6, 2014

Related U.S. Application Data

(60) Provisional application No. 61/697,169, filed on Sep. 5, 2012.

(51) Int. Cl.
*B01D 53/047* (2006.01)
*B01D 53/04* (2006.01)

(52) U.S. Cl.
CPC .......... *B01D 53/047* (2013.01); *B01D 53/0407* (2013.01); *Y10T 29/49888* (2015.01); *B01D 53/0446* (2013.01); *B01D 53/0462* (2013.01); *B01D 53/0473* (2013.01); *B01D 53/0476* (2013.01); *B01D 2253/342* (2013.01)

(58) Field of Classification Search
CPC .. B01D 53/04; B01D 53/047; B01D 53/0473; B01D 53/0476; B01D 53/0462; B01D 53/0446; B01D 53/0407; B01D 2253/342; Y10T 29/49888
USPC ........ 95/8, 90, 148, 96, 97; 96/108, 121, 131, 96/145, 152; 228/184, 193; 29/460
See application file for complete search history.

(56) References Cited

U.S. PATENT DOCUMENTS

| | | | |
|---|---|---|---|
| 1,868,138 | A | 7/1932 | Fisk |
| 3,124,152 | A | 3/1964 | Payne |

(Continued)

FOREIGN PATENT DOCUMENTS

| | | |
|---|---|---|
| CA | 2 234 924 | 4/1998 |
| CA | 2 224 471 | 6/1998 |

(Continued)

OTHER PUBLICATIONS

U.S. Appl. No. 13/602,750, filed Sep. 4, 2012, Sundaram.

(Continued)

*Primary Examiner* — Frank Lawrence
(74) *Attorney, Agent, or Firm* — ExxonMobil Upstream Research Company Law Department

(57) ABSTRACT

A method and apparatus are described for swing adsorption processes. The method includes obtaining different plates, wherein the plates have gaseous openings and a utility fluid opening. Then, the gaseous openings are substantially oriented along a common axis for gaseous openings and the plates are diffusion bonded. Once diffusion bonded, the gaseous openings within the module are wash coated with an adsorbent material.

29 Claims, 8 Drawing Sheets

(56) References Cited

U.S. PATENT DOCUMENTS

| | | |
|---|---|---|
| 3,142,547 A | 7/1964 | Marsh et al. |
| 3,508,758 A | 4/1970 | Strub |
| 3,602,247 A | 8/1971 | Bunn et al. |
| 3,788,036 A | 1/1974 | Lee et al. |
| 3,967,464 A | 7/1976 | Cormier et al. |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher, Jr. |
| 4,340,398 A | 7/1982 | Doshi et al. |
| 4,711,968 A | 12/1987 | Oswald et al. |
| 4,784,672 A | 11/1988 | Sircar |
| 4,790,272 A | 12/1988 | Woolenweber |
| 4,816,039 A | 3/1989 | Krishnamurthy et al. |
| 4,877,429 A | 10/1989 | Hunter |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,370,728 A | 12/1994 | LaSala et al. |
| 5,565,018 A | 10/1996 | Baksh et al. |
| 5,700,310 A | 12/1997 | Bowman et al. |
| 5,750,026 A | 5/1998 | Gadkaree et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,906,673 A | 5/1999 | Reinhold, III et al. |
| 5,924,307 A | 7/1999 | Nenov |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,053,966 A | 4/2000 | Moreau et al. |
| 6,063,161 A | 5/2000 | Keefer et al. |
| 6,099,621 A | 8/2000 | Ho |
| 6,129,780 A | 10/2000 | Millet et al. |
| 6,136,222 A | 10/2000 | Friesen et al. |
| 6,147,126 A | 11/2000 | DeGeorge et al. |
| 6,171,371 B1 | 1/2001 | Derive et al. |
| 6,176,897 B1 | 1/2001 | Keefer |
| 6,179,900 B1 | 1/2001 | Behling et al. |
| 6,210,466 B1 | 4/2001 | Whysall et al. |
| 6,245,127 B1 | 6/2001 | Kane et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,406,523 B1 | 6/2002 | Connor et al. |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,451,095 B1 | 9/2002 | Keefer et al. |
| 6,457,485 B2 | 10/2002 | Hill et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,241 B2 | 12/2002 | Reddy |
| 6,500,404 B1 | 12/2002 | Camblor Fernandez et al. |
| 6,506,351 B1 | 1/2003 | Jain et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,641,645 B1 | 11/2003 | Lee et al. |
| 6,651,645 B1 | 11/2003 | Lee et al. |
| 6,660,065 B2 | 12/2003 | Byrd et al. |
| 6,712,087 B2 | 3/2004 | Hill et al. |
| 6,746,515 B2 | 6/2004 | Wegeng et al. |
| 6,752,852 B1 | 6/2004 | Jacksier et al. |
| 6,802,889 B2 | 10/2004 | Graham et al. |
| 6,835,354 B2 | 12/2004 | Woods et al. |
| 6,916,358 B2 | 7/2005 | Nakamura et al. |
| 6,918,953 B2 | 7/2005 | Lomax, Jr. et al. |
| 6,974,496 B2 | 12/2005 | Wegeng et al. |
| 7,025,801 B2 | 4/2006 | Moereau |
| 7,094,275 B2 | 8/2006 | Keefer et al. |
| 7,117,669 B2 | 10/2006 | Kaboord et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,189,280 B2 | 3/2007 | Alizadeh-Khiavi et al. |
| 7,250,074 B2 | 7/2007 | Tonkovich et al. |
| 7,276,107 B2 | 10/2007 | Baksh et al. |
| 7,311,763 B2 | 12/2007 | Neary |
| RE40,006 E | 1/2008 | Keefer et al. |
| 7,314,503 B2 | 1/2008 | Landrum et al. |
| 7,390,350 B2 | 6/2008 | Weist, Jr. et al. |
| 7,404,846 B2 | 7/2008 | Golden et al. |
| 7,449,049 B2 | 11/2008 | Thomas et al. |
| 7,527,670 B2 | 5/2009 | Ackley et al. |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,687,044 B2 | 3/2010 | Keefer et al. |
| 7,713,333 B2 | 5/2010 | Rege et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,763,098 B2 | 7/2010 | Alizadeh-Khiavi et al. |
| 7,819,948 B2 | 10/2010 | Wagner |
| 7,858,169 B2 | 12/2010 | Yamashita |
| 7,938,886 B2 | 5/2011 | Hershkowitz et al. |
| 7,947,120 B2 | 5/2011 | Deckman et al. |
| 7,959,720 B2 | 6/2011 | Deckman et al. |
| 8,034,164 B2 | 10/2011 | Lomax, Jr. et al. |
| 8,071,063 B2 | 12/2011 | Reyes et al. |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,262,783 B2 | 9/2012 | Stoner et al. |
| 8,268,043 B2 | 9/2012 | Celik et al. |
| 8,272,401 B2 | 9/2012 | McLean |
| 8,361,200 B2 | 1/2013 | Sayari et al. |
| 8,444,750 B2 | 5/2013 | Deckman et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,545,602 B2 | 10/2013 | Chance et al. |
| 8,591,627 B2 | 11/2013 | Jain |
| 2001/0047824 A1 | 12/2001 | Hill et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0170527 A1 | 9/2003 | Finn et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0197596 A1* | 10/2004 | Connor et al. ............... 428/630 |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |

(56) References Cited

U.S. PATENT DOCUMENTS

| | | |
|---|---|---|
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0048648 A1 | 3/2006 | Gibbs et al. |
| 2006/0049102 A1 | 3/2006 | Miller et al. |
| 2006/0105158 A1 | 5/2006 | Fritz et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2006/0249020 A1* | 11/2006 | Tonkovich et al. ............. 95/115 |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0283807 A1 | 12/2007 | Whitley |
| 2008/0051279 A1 | 2/2008 | Klett et al. |
| 2008/0072822 A1 | 3/2008 | White |
| 2008/0282883 A1 | 11/2008 | Rarig et al. |
| 2008/0282884 A1 | 11/2008 | Deckman et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282888 A1 | 11/2008 | Deckman et al. |
| 2008/0289497 A1 | 11/2008 | Barclay et al. |
| 2008/0314244 A1 | 12/2008 | Kelley et al. |
| 2008/0314245 A1 | 12/2008 | Hershkowitz |
| 2008/0314246 A1 | 12/2008 | Deckman et al. |
| 2009/0004073 A1 | 1/2009 | Gleize et al. |
| 2009/0037550 A1 | 2/2009 | Mishra et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0241771 A1 | 10/2009 | Manning et al. |
| 2009/0308248 A1 | 12/2009 | Siskin et al. |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2011/0002818 A1* | 1/2011 | Tonkovich et al. ........... 422/211 |
| 2011/0031103 A1 | 2/2011 | Deckman et al. |
| 2011/0146494 A1 | 6/2011 | Desai et al. |
| 2011/0217218 A1 | 9/2011 | Gupta et al. |
| 2011/0277620 A1 | 11/2011 | Manning et al. |
| 2012/0024152 A1 | 2/2012 | Yamawaki et al. |
| 2012/0026797 A1 | 2/2012 | Kim |
| 2012/0026799 A1 | 2/2012 | Lee |
| 2012/0026801 A1 | 2/2012 | Lee |
| 2012/0026802 A1 | 2/2012 | Confalonieri |
| 2012/0026803 A1 | 2/2012 | Lee |
| 2012/0026804 A1 | 2/2012 | Nagashina et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman et al. |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamatoki et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |
| 2014/0033919 A1* | 2/2014 | Deckman et al. ............... 95/100 |

FOREIGN PATENT DOCUMENTS

| | | |
|---|---|---|
| CA | 2 228 206 | 7/1998 |
| CA | 2 297 591 | 2/2000 |
| CA | 2 297 590 | 8/2000 |
| CA | 2 237 103 | 12/2001 |
| CA | 2 357 356 | 3/2002 |
| EP | 0257493 | 2/1988 |
| EP | 0426937 | 5/1991 |
| EP | 1 004 341 | 5/2000 |
| EP | 1004341 | 5/2000 |
| EP | 1 018 359 | 7/2000 |
| EP | 1413348 | 8/2002 |
| EP | 1577561 | 9/2005 |
| EP | 1 203 610 | 12/2005 |
| EP | 1798197 | 6/2007 |
| EP | 1045728 | 11/2009 |
| JP | 59-232174 | 12/1984 |
| JP | 2000024445 | 8/2001 |
| JP | 2002348651 | 12/2002 |
| JP | 2006016470 | 1/2006 |
| JP | 2006036849 | 2/2006 |
| WO | WO 99/43418 | 9/1999 |
| WO | WO00/35560 | 6/2000 |
| WO | WO2005/032694 | 4/2005 |
| WO | WO2005/070518 | 8/2005 |
| WO | WO2006/017940 | 2/2006 |
| WO | WO2006/074343 | 7/2006 |
| WO | WO 2007/111738 | 10/2007 |
| WO | WO 2010/123598 | 10/2010 |
| WO | WO 2010/130787 | 11/2010 |
| WO | WO 2011/139894 | 11/2011 |
| WO | WO 2012/118757 | 9/2012 |
| WO | WO2012/118757 | 9/2012 |
| WO | WO2012/118758 | 9/2012 |
| WO | WO 2012/118758 | 9/2012 |
| WO | WO2012/118759 | 9/2012 |
| WO | WO2012/118760 | 9/2012 |
| WO | WO 2012/161826 | 11/2012 |
| WO | WO 2012/161828 | 11/2012 |
| WO | WO 2013/022529 | 2/2013 |

OTHER PUBLICATIONS

U.S. Appl. No. 13/877,315, filed Sep. 26, 2011, Sundaram et al.
U.S. Appl. No. 13/979,623, filed Feb. 27, 2012, Tammera et al.
U.S. Appl. No. 13/976,888, filed Jun. 27, 2013, Huntington et al.
U.S. Appl. No. 13/976,889, filed Jun. 27, 2013, Sundaram.
U.S. Appl. No. 13/602,750, filed Sep. 4, 2012, Sundaram, N. et al.
Conviser, (1964) "Removal of CO2 from Natural Gas With Molecular Sieves," *Publication*, pp. 1F-12F.
GE Oil & Gas (2007) "Dry Gas Seal Retrofit," Florene, Italy, www.ge.com/oilandgas.
Farooq, et al. (1990) "Continuous Contercurrent Flow Model for a Bulk PSA Separation Process," *AIChE J.*, v36 (2) p. 310-314.
FlowServe "Exceeding Expectations, US Navy Cuts Maintenance Costs With Flowserve GX-200 Non-Contacting Seal Retrofits," *Face-to-Face*, v17.1.
Herrmann, et al. (2008) "Curvelet-Based Seismic Data Processing: A Multiscale and Nonlinear Approach," *Geophysics*, v73.1, pp. A1-A5.
Hopper, et al. (2008) "World's First 10,000 psi Sour Gas Injection Compressor," *Proceedings of the 37th Turbomachinery Symosium*, pp. 73-95.
Reyes, et al. (1997) "Frequency Modulation Methods for Diffusion and Adsorption Measurements in Porous Solids," *J. Phys. Chem. B.* v101, pp. 614-622.
Sahni, et al. (2005) "Multiresolution Wavelet Analysis for Improved Reservoir Description," SPE-87820, *Soc. of Petroleum Eng.—Reservoir Evaluation & Engineering*, pp. 53-69 (XP-002550569).
Stahley, (2003) "Design, Operation, and Maintenance Considerations for Improved Dry Gas Seal Reliability in Centrifugal Compressors," pp. 1-15.
Suzuki, (1985) "Continuous-Countercurrent-Flow Approximation for Dynamic Steady State Profile of Pressure Swing Adsorption" *AIChE Symp. Ser.* v81 (242) pp. 67-73.
(2008), "Rapid Cycle Pressure Swing Adsorption (RCPSA)," QuestAir, 4 pgs.
(2008), "Rapid Cycle Pressure Swing Adsorption," ExxonMobil Research and Engineering, 2 pgs.

* cited by examiner

APPARATUS AND SYSTEMS HAVING AN ADSORBENT CONTACTOR AND SWING ADSORPTION PROCESSES RELATED THERETO

CROSS-REFERENCE TO RELATED APPLICATION

This application claims the benefit of U.S. Provisional Patent Application 61/697,169, filed Sep. 5, 2012, entitled APPARATUS AND SYSTEMS HAVING AN ADSORBENT CONTACTOR AND SWING ADSORPTION PROCESSES RELATED THERETO, the entirety of which is incorporated by reference herein.

FIELD OF THE INVENTION

Provided is a parallel channel adsorbent contactor apparatus and system along with swing adsorption processes related thereto. More particularly, provided are one or more adsorbent contactors of stacked modules, which are loaded together in a swing adsorption vessel. The fabrication, use and regeneration of the swing adsorption vessel is also described to enhance the process.

BACKGROUND OF THE INVENTION

Gas separation is utilized in many industries and can typically be accomplished by passing a mixture of gases over an adsorbent material in an adsorbent contactor that preferentially adsorbs more readily adsorbed components relative to less readily adsorbed components of the mixture. One type of gas separation technology is swing adsorption. For example, the pressure-swing adsorption (PSA) process adsorbs impurities from a gaseous stream into an adsorbent material in one step and releases the impurities in a subsequent step of a cycle. As another example, the temperature-swing adsorption (TSA) process, which may include PSA process steps, utilizes heating and cooling to enhance the effectiveness of this gas purification.

The use of the swing adsorption hardware may involve large diameter beds to minimize the number of total beds for any given application. However, manufacture and installation of large diameter beds is a difficult engineering problem, which often results in a compromise design at a smaller diameter. As a result multiple beds are often needed to achieve the same process goal. This typically results in greater expense and a larger equipment footprint.

Conventional swing adsorption vessels contain a plurality of individual monolith adsorbent contactors within a cylindrical vessel. The monolith contactors have multiple substantially parallel gas flow channels running along the longitudinal axis of the contactor, with an adsorbent material lining the walls of the open channels. Various engineering problems limit the flow through capacity of such adsorption vessels. For example, larger contactors often provide unintentional and undesirable gaseous stream paths in regions between adjacent contactors. This creates a significant problem because it is difficult to maximize the monoliths process area, while providing a robust mechanical support and hold-down structure aimed at retaining the monoliths in place during the unit operating cycles.

These problems may be further complicated by the swing adsorption process. For example, TSA processes have to overcome substantial challenges in designing equipment to achieve these process needs. Some of the challenges include: (a) rapid cycling of pressure; (b) rapid cycling of temperatures; (c) high area density requirements; and/or (d) forming sufficient microchannels with sufficient adsorbent material. Accordingly, there remains a need in the art for monolith designs that mitigate at least the above-mentioned problems, especially those associated with undesirable gaseous steam paths between contactors.

SUMMARY OF THE INVENTION

In one embodiment, a method of fabricating an adsorbent contactor is described. The method comprises obtaining two or more plates, wherein each of the two or more plates have a plurality of gaseous openings and at least one utility fluid opening; aligning the two or more plates, wherein the plurality of gaseous openings are substantially oriented along a common axis for each of the plurality of gaseous openings; diffusion bonding the aligned plates to form a module; and wash coating the plurality of gaseous openings within the module with an adsorbent material. The method may also include photo-chemical etching the two or more plates to form the plurality of gaseous openings and wherein diffusion bonding involves applying a substantial and uniform pressure across the plates inside an oven heated to approximately 70% of the melting point of the plate material.

In yet another embodiment, a method of fabricating a swing adsorption vessel is described. The method comprises obtaining two or more plates, wherein each of the two or more plates have a plurality of gaseous openings and at least one utility fluid opening; aligning the two or more plates, wherein the plurality of gaseous openings are substantially oriented along a common axis for each opening; diffusion bonding the aligned plates to form a module; and wash coating the plurality of gaseous openings within the module with an adsorbent material; and disposing the module within a housing. The method may include repeating the method to provide another module and stacking the modules, wherein the plurality of gaseous openings of each of the modules are substantially oriented along the common axis for each opening.

A method of processing a gaseous stream to remove contaminants, comprising: a) passing a gaseous stream through the swing adsorption vessel to remove contaminants from the gaseous stream, wherein the swing adsorption vessel has a plurality of stacked modules having a plurality of gaseous openings with an adsorbent material disposed within the plurality of gaseous openings and configured to adsorb at least a portion of the contaminants in the gaseous stream, and wherein each module is formed from two or more plates that are diffusion bonded together; b) passing a utility fluid through a swing adsorption vessel, wherein the plurality of stacked modules have at least one utility fluid opening and wherein the utility fluid and the gaseous stream are maintained separate from each other; c) stopping the flow of the gaseous stream through the swing adsorption vessel; and d) performing one or more of a depressurization step, a blowdown step, and a repressurization step. The method may include e) determining whether production is complete; f) if production is not complete; repeating steps a) to e); and g) if production is complete, regenerating the adsorbent material in the swing adsorption vessel. Further, the method may include regenerating the adsorbent material in the swing adsorption vessel, which includes removing the swing adsorption vessel from operation; removing the adsorbent contactor from the swing adsorption vessel; separating the plurality of stacked modules; removing the adsorbent material from each of the modules; disposing adsorbent material within the plurality of gaseous openings; and reassembling the plurality of stacked modules into the swing adsorption vessel.

In one or more embodiments, the method may include combining equipment with the adsorption contactor or module disposed within a housing to form the swing adsorption vessel. The method may include securing one or more baffles between at least one of the modules to manage the flow path of the utility fluid through the modules; securing one or more manifolds between at least one of the modules to manage the flow path of the utility fluid through the modules; securing one or more baffle arrangements to an inlet nozzle and an outlet nozzle, respectively, to provide a utility fluid flow path into one module and out of the one module or another module.

In one or more embodiments, the apparatus may be further defined to enhance operation. For example, the adsorbent contactor may include five to fifty modules within a stack or may include ten to twenty modules in a stack. In another embodiment, the plurality of gaseous openings of the module may be substantially oriented along the common axis that is in a direction perpendicular to the diffusion-bonded interfaces between the two or more plates. Further, in other embodiments, the at least one utility fluid opening of the module are substantially oriented along the common axis that is in a direction parallel to the diffusion-bonded interfaces between the two or more plates. In certain embodiments, the module has a high area density in the range of 1200 to 4000 $m^2/m^3$, in the range of 1500 to 3500 $m^2/m^3$, or in the range of 2000 to 3000 $m^2/m^3$. Also, in other embodiments, the module may have a thickness in the range of 20 mm to 200 mm.

DETAILED DESCRIPTION OF THE INVENTION

Figure 1:
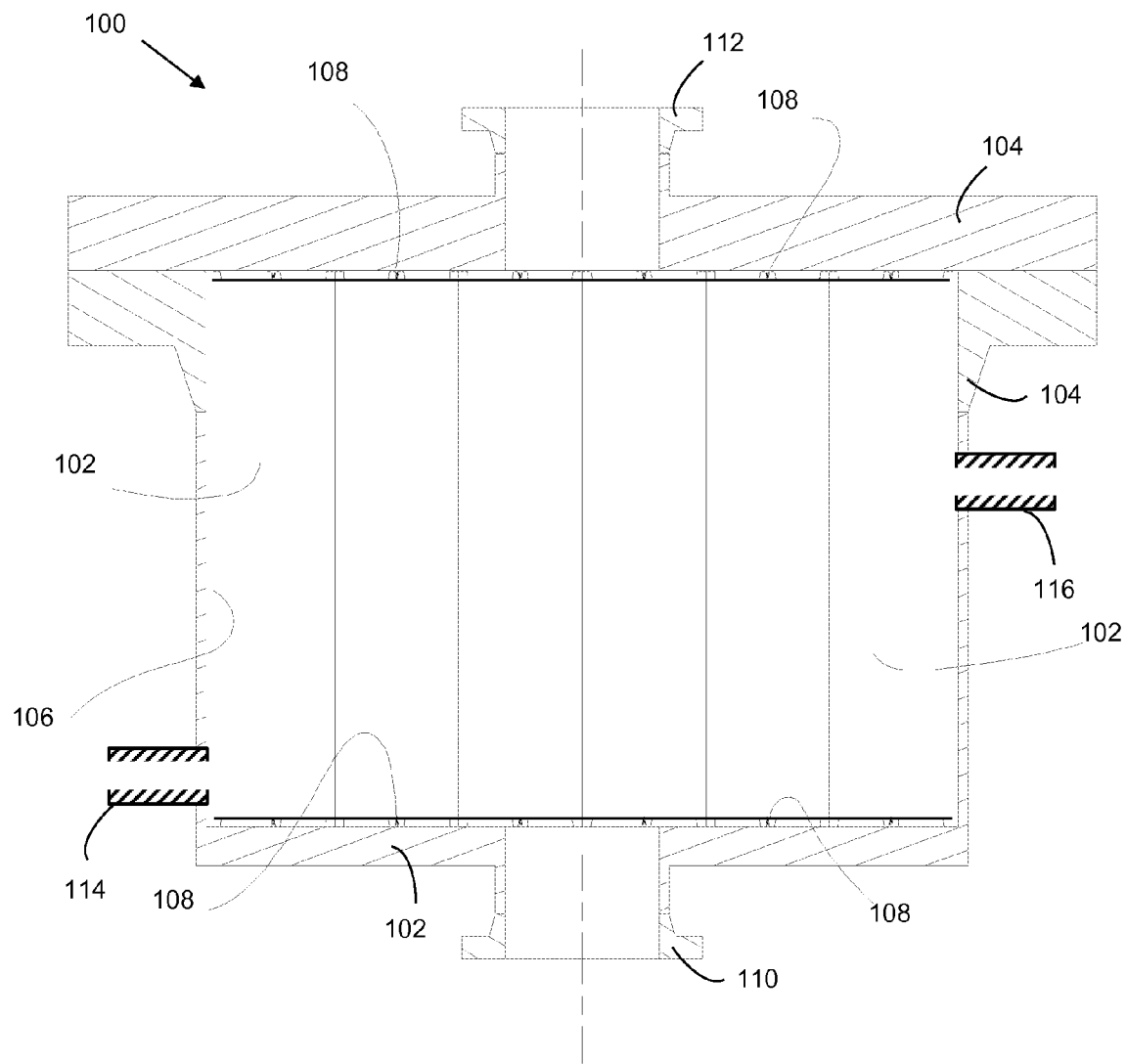
FIG. 1 hereof is a side cross-sectional view of a swing adsorption vessel showing the stacking of the adsorbent contactors in accordance with an exemplary embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Monolith adsorbent contactors are defined herein is a subset of adsorbent contactors comprising structured (engineered) adsorbents in which substantially parallel flow channels are incorporated into the adsorbent structure. These flow channels may be formed by a variety of means, including extruded ceramic monoliths, bundles of hollow fibers, spiral wound adsorbent layers, stacked layers of adsorbent sheets with and without spacers, stacking plates and/or modules and other methods. In addition to the adsorbent material, the structure may contain items such as, but not limited to, support materials, heat sink materials, void reduction components, and other materials. Exemplary contactors are described in U.S. Patent App. Pub. No. 2008/0282892, which is incorporated by reference herein.

The present techniques are directed to an enhanced adsorbent contactor for use in swing adsorption processes, which adsorbent contactors contain a plurality of flow channels. Further, these contactors may also contain 20 volume percent (vol. %) or less, preferably 15 vol. % or less, more preferably 10 vol. % or less, and most preferably 5 vol. % or less of their open pore volume in pores in the mesopore and macropore size range. The term "adsorbent contactor" as utilized herein includes both structured and unstructured adsorbent contactors. The preferred contactors of the present disclosure are a type of structured adsorbent contactor entitled herein as "parallel channel contactors" for use in thermal swing adsorption (TSA) and various types of pressure swing adsorption processes including conventional pressure swing adsorption (PSA), and partial pressure swing or displacement purge adsorption (PPSA) technologies. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies. The term swing adsorption processes is taken to include all of these processes (i.e. TSA, PSA, PPSA, RCTSA, RCPSA, and RCPPSA) including combinations of these processes. Such processes involve efficient contact of a gas mixture with a solid adsorbent material. It should also be noted that unless otherwise noted herein or by reference to specific "geometric shapes" (in which case apply only to structured adsorbent contactors), that all preferred embodiments as described in this application, such as, but limited to, contactor voidages, separation components and efficiencies, operating conditions, preferred materials, etc., apply to both structured and unstructured adsorbent contactors of the present techniques as described herein. Other related applications in the technical area include Intl. Patent Application Nos. 2012/026797; 2012/026799; 2012/026801; 2012/026802; 2012/026803; and 2012/0267804 each of which is herein incorporated by reference in its entirety.

As noted above, the PSA process involves removing impurities (e.g., $CO_2$, $H_2S$) in a gaseous stream (e.g., a natural gas stream) are adsorbed into an adsorbent material (e.g., Zeolite) under high pressure. This step is followed by a depressurization step in which the impurities are released from the adsorbent material into a tail gas stream. This process is repeated through rapid cycles, which is roughly, once every 10 to 20 seconds (sec) to remove these impurities from the gaseous stream.

The PSA process for Advanced Kinetics Separation (AKS) has been demonstrated to remove $CO_2$ from hydrocarbon containing streams (e.g., natural gas streams). However, this process is limited in its effectiveness in removing $H_2S$ from such streams. As such, PSA alone is only able to handle certain fields with a limited amount of $H_2S$. In fact, some of the gas production streams contain up to 22% (by mass) of $H_2S$, which has to be decreased to several parts per million (ppm) in the purified stream for certain processes.

Accordingly, as the PSA does not appear to provide enough $H_2S$ removal, other processes may be utilized, such as TSA and/or other scrubbers. Conventional processes typically involve scrubbers (e.g., Amine systems) to remove the $H_2S$ contaminates. These other systems require more energy as compared to a TSA process along with greater plot space and equipment compared to the TSA process.

The TSA process involves a heating step (e.g., during removal of impurities from adsorbent material, which is typically at a lower pressure) and a cooling step (e.g., prior to adsorption of impurities into adsorbent material, which is typically at a higher pressure). This heating and cooling of the exchanger substantially enhances effectiveness of this gas purification as compared to a PSA process without the temperature swing. The TSA process is also more beneficial in removing H2S from the gas stream for which PSA alone is inadequate. For this process, the temperature swing occurs inside of the PSA cycle at low pressure. Other related applications in the technical area include U.S. Patent Application Pub. Nos. 20080314244; 20080282888; and 20080314245, each of which is herein incorporated by reference in its entirety.

However, TSA processes have to overcome substantial challenges in designing equipment to achieve these process needs. As a specific example, some of the challenges include: (a) rapid cycling of pressure (from 1 bar to 85 bar, for example), (b) rapid heating and cooling requirements (each phase being about 20 seconds (sec) in duration), (c) need a high area density (e.g., in the range of 1200 to 4000 $m^2/m^3$, in the range of 1500 to 3500 $m^2/m^3$, or in the range of 2000 to 3000 $m^2/m^3$) to minimize thermal mass through the use of microchannels, (d) wash-coating techniques to apply a very thin and uniform layer of adsorbent in micro-channels, and/or (e) maximizing the depth of micro-channels to carry out wash-coating. Currently it is challenging to coat the inside of the small channels to lengths greater than 2 inches (in.) (50 millimeters (mm)), or even greater than 6 in. (150 mm).

Accordingly, in one or more embodiments, a diffusion-bonded exchanger design with micro-channels may be utilized to enhance the process. However, this diffusion-bonded exchanger design has several limitations. For example, these limitations include: (a) the channel length is generally greater than the current maximum limitation of two-inch (50 mm) depth; (b) the micro-channels have a semi-circular cross-section that is less conducive to high-quality wash-coating methods, and (c) the area density is less than 1000 $m^2/m^3$, which is significantly less than 1200 to 4000 $m^2/m^3$ provided by the present techniques, discussed further below.

The present techniques relate to an enhanced swing adsorption system. This system includes the fabrication of an adsorbent contactor and/or swing adsorption vessel, use of such vessel and regeneration of such vessel. The swing adsorption vessel may include an adsorbent contactor formed from various plates and/or modules (e.g., stack of modules and/or plates). These plates and modules may include gaseous channels for a gaseous stream passing through at least a portion of the adsorbent contactor and utility fluid channels for a utility fluid passing through at least a portion of the adsorbent contactor. The gaseous channels may be utilized to remove contaminants from a gaseous stream (e.g., natural gas stream) during an adsorption step and release the contaminants during regeneration steps (e.g., depressurization steps, purge steps and/or blow down steps). The utility fluid channels may be utilized to pass a utility fluid (e.g., water) to heat and cool the modules.

There are several benefits of the present techniques over the prior art. For example, the use of thin plates in the fabrication process provides flexibility forming the adsorbent contactor (e.g., the size and direction of the openings) and the associated dimensions of the adsorbent contactor (e.g., the size of the adsorbent contactor is not limited by material or fabrication techniques, as it is a modular configuration). In particular, the fabrication technique may provide smaller opening depths of bonded plates (e.g., the channels in the modules may be in the range from 1 inch to 6 inches, or 1 inch to 2 inches), which provide flexibility in the process for applying the adsorbent material. Further, the method may involve a specific sequence to further enhance the fabrication of the adsorbent contactor. As an example, the gaseous openings may be formed prior to diffusion-bonding of the different thin plates. Then, a wash coating process may be applied following the diffusion-bonding to limit any potential damage to the adsorbent material. Also, the fabrication may provide additional flexibilities with the spacing of openings to further enhance the thermal efficiencies and the openings may be oriented parallel or perpendicular to the diffusion bonding. Moreover, the modular arrangement provides a simplified technique for regeneration of the adsorbent material, which may be performed once the adsorbent material has exceeded its use.

The structure of parallel channel contactors, including fixed surfaces on which the adsorbent or other active material is held, provides significant benefits over previous conventional gas separation methods, such as vessels containing adsorbent beads or extruded adsorbent particles. "Parallel channel contactors" are defined herein as a subset of adsorbent contactors comprising structured (engineered) adsorbents in which substantially parallel flow channels are incorporated into the adsorbent structure. These flow channels may be formed by a variety of means, many of which are described herein and in addition to the adsorbent material, the adsorbent structure may contain items such as, but not limited to, support materials, heat sink materials, void reduction components, etc., which are described more fully herein.

The adsorbent contactor of the present techniques can be made from any suitable material that is able to withstand the operating conditions and environment of their intended use, preferably swing adsorption conditions. Such conditions include temperatures up to 300° C. or up to 350° C. and pressures up to 1200 pounds per square inch absolute (psia) (8274 kilo Pascal absolute (kPaa)). Preferably, the temperature is in the range of 30° C. to 350° C. or even in the range of 30° C. to 150° C.

In certain embodiments, the adsorbent contactor may be five to fifty modules stacked together or even 10 to 20 modules stacked together. Each module may have a high area density in the range of 1200 to 4000 $m^2/m^3$, in the range of 1500 to 3500 $m^2/m^3$, or in the range of 2000 to 3000 $m^2/m^3$. Further, the module has thickness in the range of 20 mm to 200 mm. The present techniques can be better understood with reference to the FIGS. 1 to 9 below.

FIG. 1 hereof is a side cross-sectional view of a swing adsorption vessel 100 showing the stacking of the adsorbent contactor 102 and a means for hold-down and support. This swing adsorption vessel 100, which may be cylindrical or other suitable shape, include a monolith adsorbent contactor 102 disposed within a housing 104. The housing 104, which may be carbon steel structure with insulation (polymer coating) on the interior surface, may include the necessary gasket-seating surfaces, gaskets and bolts to provide robust pressure vessel requirements. Disposed between the housing 104 and the monolith adsorbent contactor 102 may be a liner 106. Preferably the monolith adsorbent contactor 102 is concentrically positioned within the liner 106, which may be a formed metallic liner. The monolith adsorbent contactor 102 is maintained within the housing 102 by mechanical hold-down and support structures 108 disposed between the housing 102 and the monolith adsorbent contactor 102. Also, in other embodiments, a gasket (not shown) may be utilized within the housing 104 to manage the flow of fluids through the swing adsorption vessel 100.

To pass a gaseous stream through the adsorbent contactor 102, a gas inlet portion 110 and a gas outlet portion 112 may be formed in the housing 104. The gaseous stream may flow through the gas inlet portion 110 into the channels formed through the adsorbent contactor 102 and be conducted away from the adsorbent contactor 102 via the gas outlet portion 112. The channels in the adsorbent contactor 102 are the space formed to provide a passage for gaseous flow through the adsorbent contactor 102. The term "space" means a region or volume, which may be bounded by one or more objects.

For certain applications, a utility fluid (e.g., water) may also be passed through the swing adsorption vessel 100. To pass the utility fluid through the adsorbent contactor 102, a utility inlet portion 114 and a utility outlet portion 116 may be formed in the housing 104. The utility fluid may flow through the utility inlet portion 112 into utility channels formed through the adsorbent contactor 102 and be conducted away from the adsorbent contactor 102 via the utility outlet portion 116. The utility channels in the adsorbent contactor 102 are the space formed to provide a passage for utility flow through the adsorbent contactor 102.

While the monolith adsorbent contactor 102 of the swing adsorption vessel 100 may be fabricated in a variety of different methods, the use of stacked modules may provide certain enhancements for the swing adsorption process. In particular, the formation of modules from various plates may be utilized to reduce leaks and provide gaseous openings that may be coated with adsorbent material. Such a design may be provided with a baffle arrangement. The local flow configuration may be a cross-flow (usually, less desirable), but the overall flow may be configured to be a parallel flow configuration.

Figure 2A:
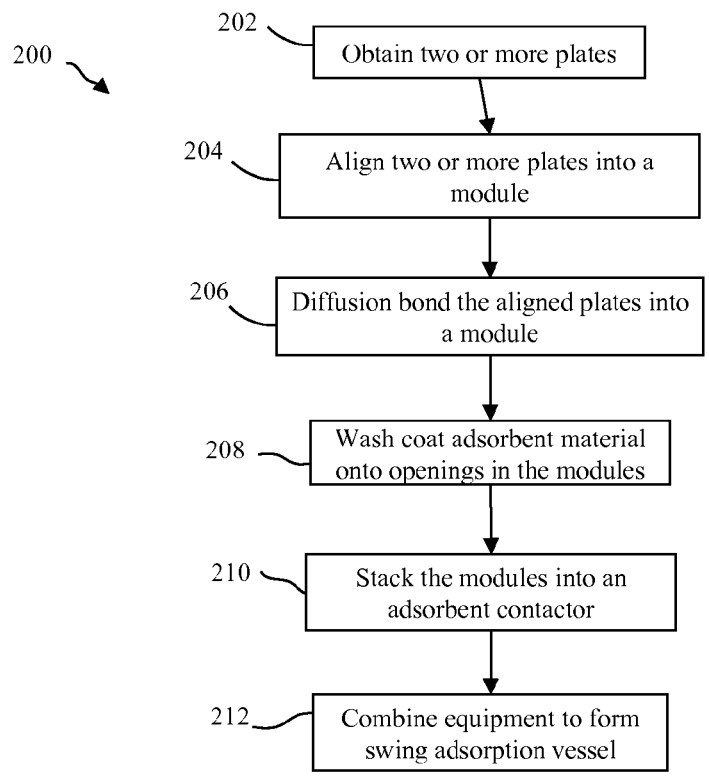
FIG. 2A is a block diagram of an exemplary fabrication of a swing adsorption vessel in accordance with an exemplary embodiment of the present techniques.

FIG. 2A is a block diagram of an exemplary fabrication of a swing adsorption vessel in accordance with an exemplary embodiment of the present techniques. The blocks 202 to 206 of the method may be performed as part of a module formation stage, blocks 208 to 210 may be performed to form as part of a stack formation stage, and block 212 of the method may be performed as part of a swing adsorption vessel formation stage.

The method 200 may begin at block 202 with two or more plates are formed. The formation of the plates may include forming or obtaining plates having a predetermined thickness, cutting along the outer boundary using laser machine or a shearer, and forming (e.g., drilling, etching or sintering) openings into the plates to provide the specific pattern for the configuration, and other fabrication steps to fabricate the plates. The thickness of the plates may depend upon the method of forming the openings (e.g., the drilling process or sintering process). This drilling process may include (a) photo-chemical etching (PCE), (b) electrical-discharge machining (EDM), (c) laser-drilling, and (d) stamping, while the sintering process, which does not involve drilling, forms the openings via a mold (in the form of precisely aligned pins) used for this process. Preferably, the PCE process may be utilized as it is more reliable and an economical approach. Once the plates are formed, two or more plates may be aligned into a module, as shown in block 204. The alignment of the two or more plates may include stacking one or more types of plates into a stack and/or adjusting the openings of the plates to be substantially oriented with each other within a specific threshold. The adjusting the openings of the plates may include inserting a pin through one or more openings and/or inserting the plates into a container that aligns edges of the plates with each other. Then, the aligned plates are diffusion bonded to each other to form a module, as shown in block 206. The diffusion bonding process generally involves the application of a substantial and uniform pressure across the plates inside an oven heated to approximately 70% of the melting point of the plate material. In other words, the temperature required depends on the metallurgy, while the pressure depends on the metallurgy involved as well as the plate thicknesses involved and the needed bond strength. The diffusion-bonding process has been a well-known art in the industry.

With the module formation stage complete, the modules are formed into a stack of modules (e.g., adsorbent contactor). At block 208, the modules may be wash-coated with an adsorbent material. The wash coating process may include dip coating, spray coating or electro-chemical deposition, and other suitable techniques. Then, at block 210, the modules are stacked to form the adsorbent contactor. The stacking of the adsorbent contactors may include forming the seal mechanisms for the stack of modules. The seal mechanism may include machining one or more of the modules to form grooves for a gasket, laser welding the modules into the stack of modules. As may be appreciated, the forming the seal mechanism may be performed prior to the wash coating for certain embodiments. The stacking the modules may include aligning the modules to have the openings of the modules concentrically disposed along a common axis through the openings of the modules. Further, each module may be configured to have substantially similar total thickness without any deformations or warping. Otherwise, the module may be machined on a milling machine with a small cut to achieve the high tolerances for each module. Then, the plates should be cleaned to remove any metal shavings. The shavings may be removed by using a high-pressure jet of air or, preferably, nitrogen or steam.

With the stack formation stage complete, the swing adsorption vessel is formed. At block 212, equipment may be combined with the adsorption contactor to form the swing adsorption vessel. As an example, the adsorption contactor may be disposed within a housing, the housing may be secured to maintain certain pressures, and conduits and/or lines may be fluidly connected to the housing. Further, baffles may be secured to between certain modules to manage the flow path of the certain streams, such as the utility fluid. At the bottom and at the top of the vessel, special baffle arrangements (not shown) may be utilized to facilitate the inlet and outlet nozzles, respectively, away from the shell girth flanges and to allow utility fluid flow in and out of the bottom-most and top-most modules. On the other hand, inlet and outlet nozzles may be provided on the bottom and top plates 507 and 506. In another example, the adsorbent contactor may be disposed between two pressure plates. Then, manifolds may be coupled to the modules to provide fluid flow path through one or more modules of the adsorbent contactor.

Beneficially, this fabrication method provides various enhancements. For example, the embodiments allow efficient use of modules of limited length. This provides flexibility in the fabrication process. For example, if a wash-coating process is utilized, it should be subsequent to the formation of the modules and/or stack of modules.

Also, the openings in the plates are formed prior to diffusion bonding. As a specific example, the wash-coating process may follow the diffusion-bonding processes because the coatings may be damaged by high temperatures in the diffusion-bonding process, as the wash-coating of channels having a small diameter may be limited to only a few inches so conventional diffusion-bonded heat exchangers designs for these applications is problematic. If the wash-coating depth within the channels can be increased substantially, the number of modules can be decreased thereby decreasing the number of gaskets needed; this may lessen potential leaks. However, the number of gaskets needed may be determined by the wash-coating limitations. For example, if a wash-coat is applied to a depth of 6 inches (in.) instead of 2 in., the number of gaskets may be decreased by a factor of about three and thereby decrease the leak probability by a factor of three. This aspect may also include wash-coating of modules to provide a layer of adsorbent material in each gaseous opening. This may be achieved prior to assembly of the modules into the swing adsorption vessel (e.g., the exchanger unit).

Also, this modular arrangement provides a technique of potential regeneration of the adsorbent material, which may be at least once a year or at least once every two years. To regenerate the modules, high-pressure steam may be applied across the top and bottom surfaces of the modules. Thus, this configuration provides a mechanism for regeneration.

Further, the fabrication method provides flexibility in the configuration of the openings, which may be in the same direction as the pressure force used in the diffusion bonding process. Conventional diffusion bonded heat exchangers have both sets of channels perpendicular to the pressure force during diffusion bonding, which results in a larger metal thickness being required to withstand those pressures. In the configuration outlined in this invention, the distance between any two pairs of openings has no impact on the pressure-integrity concern, but the distance from the edge of the first row of gaseous openings to the edge of the utility fluid opening is a factor; this region involves diffusion-bonding with high reliability; the integrity of this region may be improved by providing a thin layer of brazing material on the inside surfaces of the channels for the utility fluid; this would be achieved following the diffusion-bonding process and the machining of gasket grooves; such an approach is readily feasible as the brazing temperature is generally much less than that required for diffusion bonding. In the present techniques, the pressure-containing forces may be applied in a direction perpendicularly to the diffusion-bonded interfaces; such an arrangement is less likely to lead to de-bonding of these interfaces that may otherwise lead to leaks. On the other hand, if a conventional diffusion-bonded design is used to fabricate a two-inch deep module (to satisfy wash-coating requirements), all of the bonded interfaces may be arranged in the vertical direction (e.g., considering the apparatus outlined in FIGS. 1, 5 and 6); then, the gasket grooves are machined on the surfaces having a large number of parallel bonded interfaces; such an arrangement may lead to different forces being applied across these interfaces, thereby leading to potential "de-bonding" of these interfaces and structural failures of the unit.

As another benefit, the dense spacing of the openings may reduce the time for heat transfer; this results from the reduced distances over which heat has to be conducted as well as from the reduced "thermal mass" resulting from a reduction in metal volume. This aspect is useful because rapid-cycle processes are sensitive to the heat transfer.

Finally, the present techniques provide a mechanism for regeneration of the modules, which is not provided from conventional techniques. For example, the modules or sub-modules may have the adsorbent material removed once it has become ineffective. Then, the new adsorbent material may be applied to the sub-modules and/or plates to reuse the underlying structure. This regeneration of the modules may reduce equipment and operational costs, which includes one embodiment as noted below in FIG. 2B.

Figure 2B:
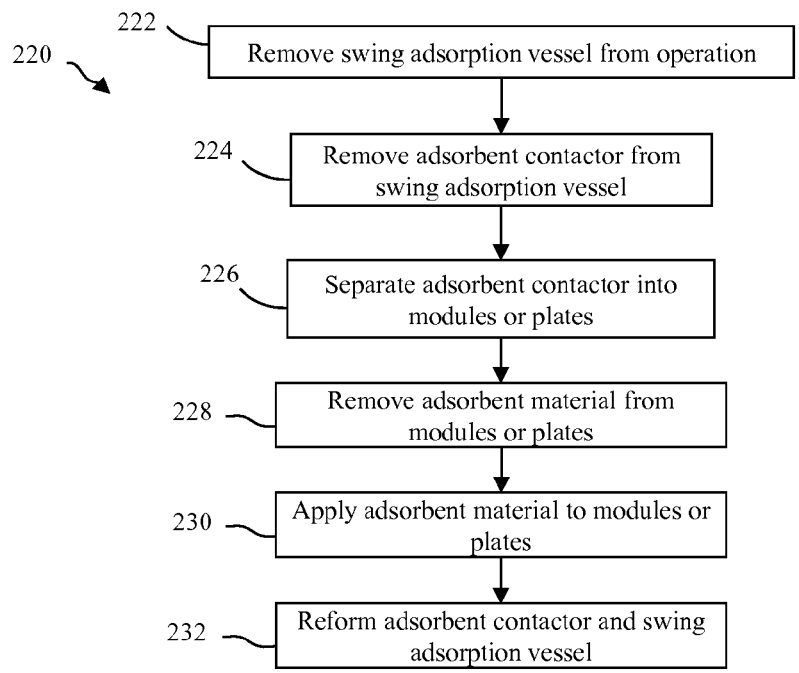
FIG. 2B is a block diagram of an exemplary method of using the swing adsorption vessel in accordance with an exemplary embodiment of the present techniques.

As an example, FIG. 2B is a block diagram 220 of an exemplary regeneration method for the swing adsorption vessel in accordance with an exemplary embodiment of the present techniques. This regeneration process may include removing the apparatus from service, removing the modules, removing the adsorbent material from the adsorbents and reforming the swing adsorption vessel. The process may need to perform this regeneration when the adsorbent material is not performing within certain operating conditions. As an example, when the $H_2S$ and $CO_2$ concentrations in the processed gas stream do not achieve the required specification, the process may be adjusted to increase the cycle time to some extent. However, this adjustment may result in adsorption of $CH_4$ into the adsorbent material as well; such an increased cycle time may also decrease the production throughput. Thus, the operating conditions may be exceeded. Accordingly, the adsorbent material may be regenerated when the performance falls below this level, as a minimum effectiveness may be needed for the process.

In this process the swing adsorption vessel is removed from operation, as shown in block 222. The removal from operation may include closing valves to prevent flow of the gaseous stream and/or utility fluid stream to the vessel, for example. Then, the adsorbent contactor is removed from the swing adsorption vessel, as shown in block 224. This removal of the adsorbent contactor may include removal of conduits, baffles, manifolds, housing and other equipment that is disposed around or associated with the adsorbent contactor. The removal process may include transporting the adsorbent contactor from the vessel to another location for regeneration.

Once the adsorbent contactor is removed from the swing adsorption vessel, the adsorbent contactor may be regenerated. At block 226, the modules and/or plates of the adsorbent contactor may be separated. The separation may include removing a portion of the module or otherwise removing the bonding between the plates and/or modules. Then, the adsorbent material is removed from the plates and/or modules, as shown in block 228. The removal of the adsorbent material may include hydro-blasting the modules and/or plates to remove the adsorbent, heating the modules or plates to remove the adsorbent material and/or other suitable methods to separate the adsorbent material from the plates or modules.

Following the removal of the old adsorbent material, the plates or modules may be taken through similar steps in the fabrication process of FIG. 2A to fabricate the swing adsorption vessel. At block 230, the adsorbent material may be applied to the plates and/or modules. The application of the adsorbent material may be similar to the method steps noted above in blocks 204 to 208 of FIG. 2A. Once the adsorbent material is applied, the swing adsorption vessel may be reformed. The reforming of the swing adsorption vessel may include method steps similar to the method steps noted above in blocks 210 to 212 of FIG. 2A. Once the swing adsorption vessel is reformed, it may be placed back into operation, which may include a method as noted below in FIG. 2C.

In operation, the swing adsorption vessel may be useful in adsorptive kinetic separation processes, for development and production of hydrocarbons, such as gas and oil processing. Particularly, the provided apparatus and system may be useful for the rapid, large scale, efficient separation of a variety of target gases from gas mixtures. In such processes, the swing adsorption vessel may be utilized to withstand the large forces applied to the adsorbent contactor (e.g., stack of plates or modules) during rapid cycle swing adsorption processes. In particular, the apparatus may be utilized in a TSA processes that utilizes lower temperatures to adsorb gases within the pore structure or free volume of an adsorbent material. By cyclically swinging the temperature of an adsorbent bed, the TSA processes can be used to separate gases in a mixture when used with an adsorbent that is selective for one or more of the components of a gas mixture. This process is further enhanced by the utility fluid utilized in this apparatus.

Figure 2C:
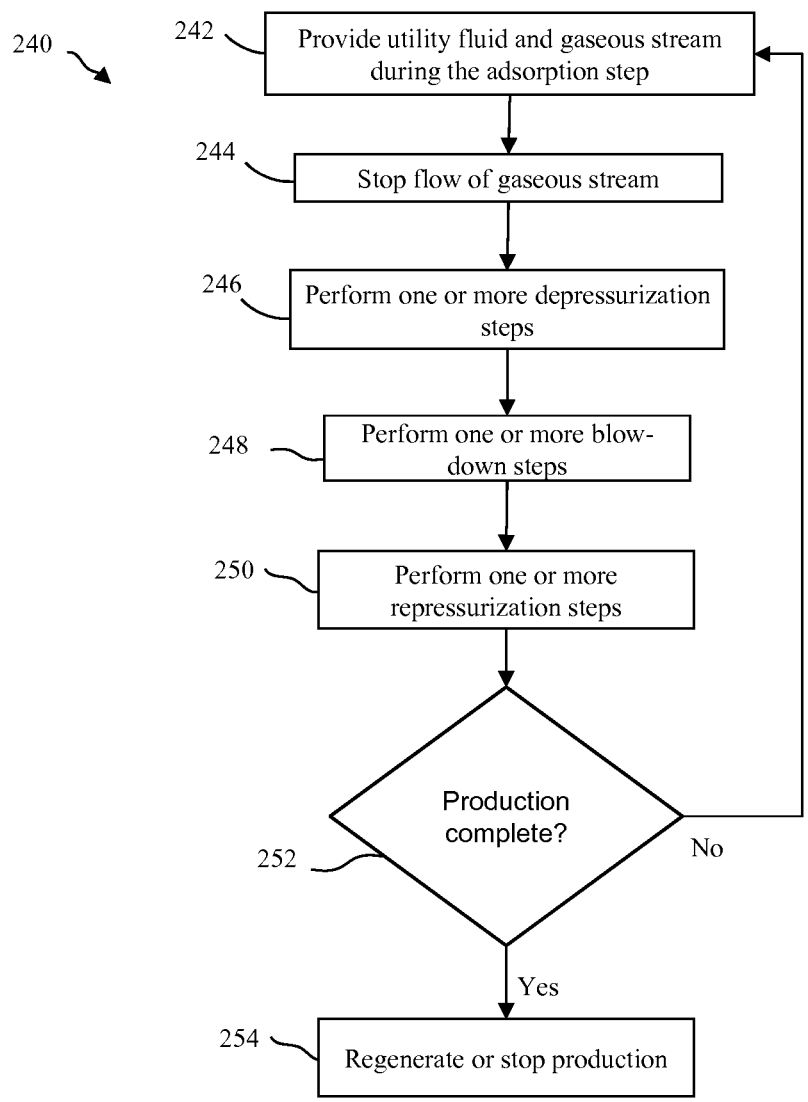
FIG. 2C is a block diagram of an exemplary regeneration method for the swing adsorption vessel in accordance with an exemplary embodiment of the present techniques.

As an example, FIG. 2C is a block diagram of an exemplary method 240 of using the swing adsorption vessel in accordance with an exemplary embodiment of the present techniques. In this method, the swing adsorption vessel may undergo different steps in an adsorption cycle, such as an adsorption step, one or more depressurization/desorption steps, one or more blow-down steps, and one or more repressurization steps. The flow of gas and utility fluid to and from each bed is typically controlled by valves, such as a poppet valve and/or a rotary valve assembly.

To begin, the swing adsorption vessel is operated in a production mode. During the production mode, a utility fluid and a gaseous stream are provided to the swing adsorption vessel during an adsorption step, as shown in block 242. This providing may include passing the gaseous stream through the gaseous openings to remove contaminates from the gaseous stream, and passing the utility fluid through the utility openings. Each of these streams may be maintained separate from each other to prevent mixing of the streams, but may utilize the modules to transfer heat from one stream to the other, depending on the temperature differences of the step in the cycle. The gaseous stream may include natural gas stream with the adsorption material being configured to remove contaminants and heavy hydrocarbons, i.e., hydrocarbons having at least two carbon atoms. The adsorbent material may be configured to remove contaminants for dew point control, sweetening/detoxification, corrosion protection/control, dehydration, heating value improvements, conditioning, and purification. Exemplary "not to exceed" product (or "target") gas specifications include: (a) 2 volume percent (vol. %) $CO_2$, 4 ppm $H_2S$, (b) 50 ppm $CO_2$, 4 ppm $H_2S$, or (c) 1.5 vol. % $CO_2$, 2 ppm $H_2S$. At block 244, the gaseous stream is stopped. This may include diverting the gaseous stream to another swing adsorption vessel and/or closing a valve to hinder the flow of the gaseous stream to the swing adsorption vessel.

During the non-production mode, one or more depressurization/desorption steps, one or more blow-down steps, and one or more repressurization steps may be utilized to remove the contaminates within the swing adsorption vessel. At block 246, one or more depressurization steps are performed. The depressurization steps may be stored into individual tanks for the subsequent repressurization steps. Then, at block 248, one or more blow-down steps may be performed. Then, one or more repressurization steps may be performed in block 250. The repressurization steps may utilize gas stored in individual vessels from one or more of the depressurization steps.

Then, a determination is made whether the production is complete, as shown in block 252. If the production is not complete, the method may repeat the process by providing a utility fluid and a gaseous stream to the swing adsorption vessel during an adsorption step, as shown in block 242. If the production is complete, the production is stopped and the swing adsorption vessel may be regenerated, as shown in block 254. The stopping of the production may include adjusting valves to prevent fluids from entering the swing adsorption vessel. The regeneration may include the regeneration method as noted above for FIG. 2B.

To manage the flow of fluids through the monolith adsorbent contactor, the channels may be provided by forming holes and/or voids within different layers and/or modules of the adsorbent contactor. As an example, FIG. 3A hereof is a partial top view of a section 300 of a bundle of stacked adsorbent contactors in accordance with an exemplary embodiment of the present techniques. The adsorbent contactor may be formed by one or more plates and/or one or more modules (e.g., two or more combined plates). The plates may have a thickness in a range from 0.3 mm to 50 mm, in a range from 0.38 mm to 50 mm, or in a range from 0.3 mm to 1 mm. In this view, one or more gaseous holes or openings 302a and 302b (which may be referred to as gaseous openings 302) and a utility fluid opening 304 are formed to provide fluid passages through the top plate 306 of the absorbent contactor, which may be an embodiment of the monolith adsorbent contactor 102. These one or more gaseous opening 302 and utility fluid opening 304 may be formed in each of the plates and/or modules of the absorbent contactor to form the respective channels for the different streams flowing through the absorbent contactor. Another mechanism that may be utilized to manage the flow of fluid may be a gasket. A portion of the gasket 308 that is utilized to manage fluid flow away from the channels. The gasket may be disposed adjacent to the top plate 306 of the absorbent contactor near an edge area 310 of the absorbent contactor. In particular, the gasket may be disposed between a housing (not shown) and the adsorbent contactor to provide additional flow control utilized to hinder flow from the non-preferred flow paths. The edge area should remain intact before the PCE step and diffusion bonding. However, once the diffusion-binding process is complete, this portion may be milled out from the middle plates (e.g., plate types 406) of each module to reveal the channel for the utility fluid.

In the top plate 306 of the adsorbent contactor, the one or more gaseous holes 302 and utility fluid hole 304 may be formed into a specific pattern or configuration. The one or more gaseous holes 302 may have diameter in the range 0.2 mm to 5 mm or in the range 0.3 mm to 1 mm or in the range 0.3 mm to 2 mm. As a specific example of the configuration, the different gaseous openings 302 may be formed in the top plate in a parallel configuration. In this configuration, eight rows of openings 302a (which are divided by a line of symmetry 312) are located in an interior region of the top plate 306, while four rows of openings 302b are disposed adjacent to an edge region. These openings 302a and 302b are separated by the utility fluid opening 304. In this configuration, the utility fluid opening 304 may be utilized to heat and/or cool the four rows of openings 302a and 302b adjacent to the utility fluid opening 304. The number of rows of openings that is associated with the utility fluid opening may be subject to an optimization calculation based on heat conduction time in the solid, which is dependent on the opening diameter. The diameter of the openings 302a and 302b and the pitch of the openings 302a and 302b may, preferably, be less than a millimeter, while the width of the utility fluid opening 304 may be less than or equal to 2 millimeters (mm). The dimensions of the openings 302a and 302b provide a high surface area for the gaseous stream (e.g., 1000 to 4000 $m^2/m^3$). In this manner, the area density may be maximized to increase the effectiveness of the exchanger (e.g., a reduced "thermal mass"), while also minimizing the overall cost.

Figure 3A:
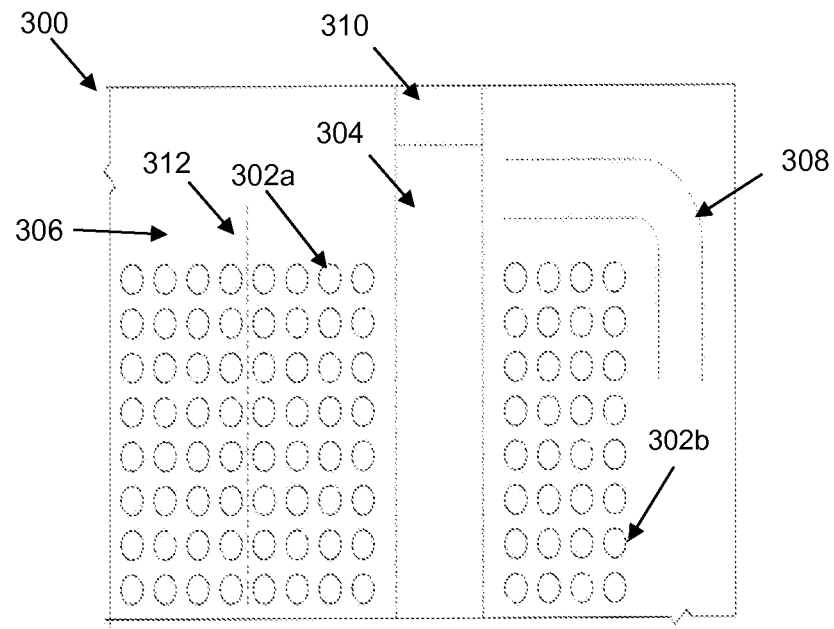
FIG. 3A hereof is a partial top view of a section of the bundle of stacked adsorbent contactors in accordance with an exemplary embodiment of the present techniques.
Figure 3B:
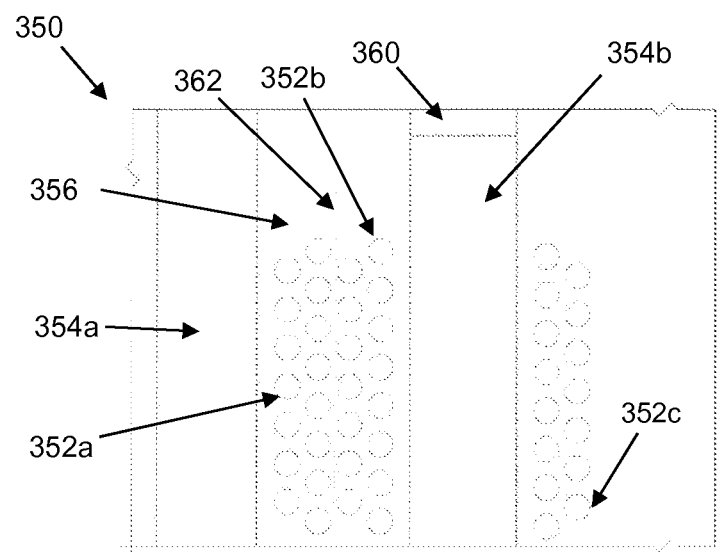
FIG. 3B hereof is a partial top view of a section of the bundle of stacked adsorbent contactors in accordance with another exemplary embodiment of the present techniques.

To further enhance the flow of the gaseous steam, different gaseous opening configurations may be utilized for the gaseous channels in the plates or modules. As an example, FIG. 3B is a partial top view of a section 350 of the bundle of stacked adsorbent contactors in accordance with another exemplary embodiment of the present techniques. In this view, one or more gaseous holes or openings 352a, 352b and 352c (which may be referred to as gaseous openings 352) and a utility fluid opening 354a and 354b (which may be referred to as utility fluid openings 354) are formed to provide fluid passages through the top plate 356 of the absorbent contactor, which may be an embodiment of the monolith adsorbent contactor 102. Similar to the discussion of FIG. 3A, these one or more gaseous opening 352 and utility fluid opening 354 may be formed in each of the plates and/or modules of the absorbent contactor to form the respective channels for the different streams flowing through the absorbent contactor. Further, the top plate 356 may also include gasket (not shown) and an edge region 360, which are similar to those described in FIG. 3A. Also, as noted above, the edge area should remain intact before the PCE step and diffusion bonding. Once diffusion-bonding process is complete, this portion should be milled out from the middle plates (e.g., plate types 406) of each module to reveal the channel for the utility fluid.

In the top plate 356 of the adsorbent contactor, the one or more gaseous holes 352 and utility fluid hole 354 may be formed into a specific pattern or configuration. As a specific example in this embodiment, the different gaseous openings 352 may be formed in the top plate. 356 in an alternate triangular arrangement or configuration. In this configuration, two rows of openings 352b (which are separated from the gaseous openings 352a by a line of symmetry 362) are located in an interior region of the top plate 356, while two rows of gaseous openings 352c are disposed adjacent to an edge region. The utility fluid opening 354b is disposed between these openings 352b and 352c. In this configuration, the utility fluid opening 354b may be utilized to heat and/or cool the four rows of openings 352b and 352c adjacent to the utility fluid opening 354b. The number of rows of openings that is associated with the utility fluid opening may be subject to an optimization calculation based on heat conduction time in the solid, which is dependent on the opening diameter. The utility fluid opening 354a may be utilized to heat and/or cool the four rows of openings 352a and another not shown adjacent to the utility fluid opening 254a.

Beneficially, this configuration provides the openings for the gas flow are in the same direction as the imposed pressure force used in the diffusion bonded process. This allows the openings to be spaced very close together and reduces the time for heat transfer, which is sensitive in the rapid-cycle process operation. As noted above, conventional diffusion bonded heat exchangers have both sets of channels perpendicular to the pressure force during diffusion bonding, which results in a larger metal thickness being required to withstand those pressures. In this configuration, the distance between any two pairs of openings does not factor into the pressure-integrity concern, but the distance from the edge of the first row of gaseous openings to the edge of the utility fluid opening is a factor; as this region involves diffusion-bonding with high reliability.

To view the channels formed by these various openings, the adsorbent contactor may be formed by one or more plates and/or one or more modules (e.g., two or more combined plates) that are stacked together. As an example, FIG. 4A hereof is a partial cross sectional view of a section 400 of a bundle of stacked adsorbent contactor in accordance with an exemplary embodiment of the present techniques. As shown in this figure, two types of thin plates may be utilized, which are (i) plates 402 without utility fluid openings and (ii) plates 404 with utility fluid openings 406. Each of the plates 402 and 404 include gaseous openings 408 to provide a fluid passage through the stacked adsorbent contactor. For the first type of plates 402, no material is removed for the utility fluid openings 406, while the second type of plate 404 has utility fluid openings 406. The plates near the edge area of the absorbent contactor may not be removed to maintain integrity of the plate for handling purposes and for maintaining relative positions of the gas opening patterns.

In certain embodiments, another type of plate may be utilized with the plates noted above to provide fluid flow for the utility fluid. This third type of plate may be similar to the plates 404 with utility fluid openings 406, but areas near the edge area may be removed to provide direct access into the utility fluid opening. As an example, following assembly (with very high tolerance) and diffusion-bonding of the thin plates into a module, a portion of the plates may be milled to reveal the utility fluid opening. Following the diffusion-bonding step to form a module, a thin layer of high-temperature solder may be provided on the surfaces forming the utility fluid channels.

Figure 4A:
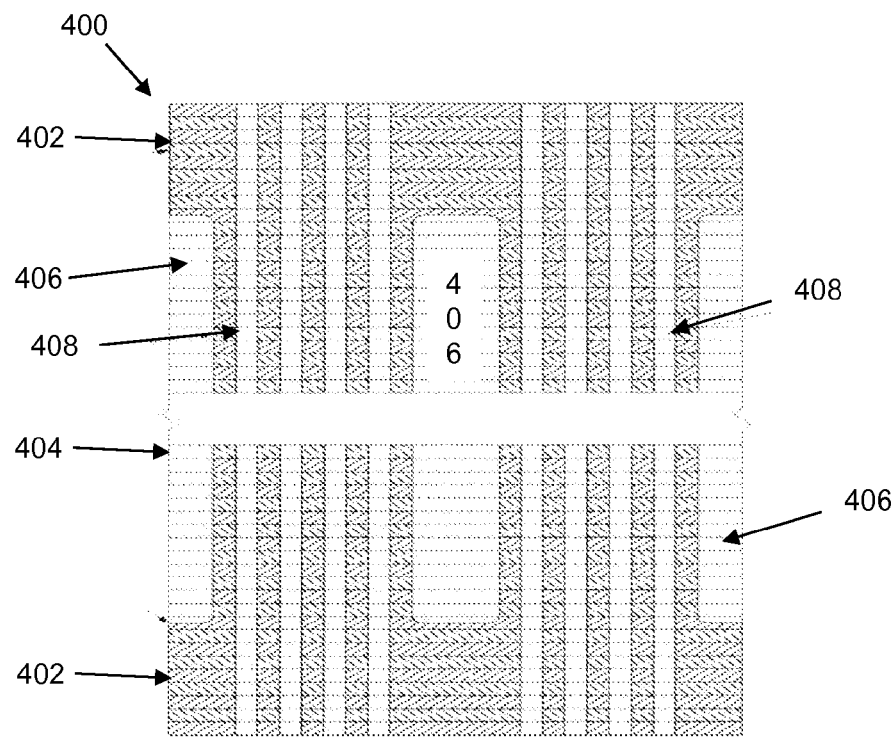
FIG. 4A hereof is a partial cross sectional view of a section of a bundle of stacked adsorbent contactor in accordance with an exemplary embodiment of the present techniques.
Figure 4B:
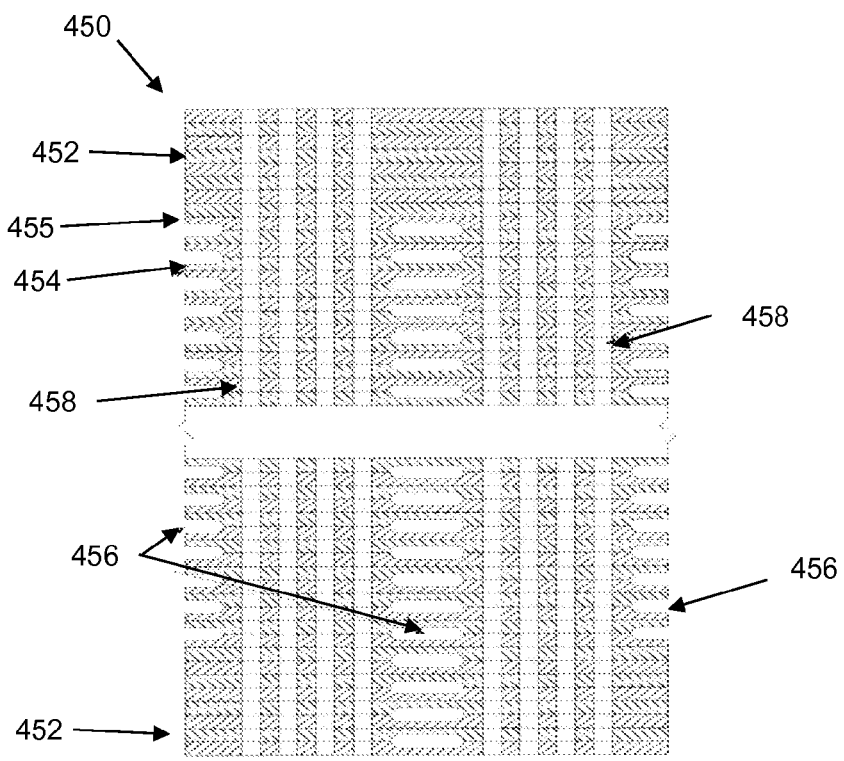
FIG. 4B hereof is a partial cross sectional view of a section of a bundle of stacked adsorbent contactor in accordance with another exemplary embodiment of the present techniques.

As an alternative embodiment, FIG. 4B hereof is a partial cross sectional view of a section 450 of a bundle of stacked adsorbent contactor in accordance with another exemplary embodiment of the present techniques. As shown in this figure, three types of thin plates may be utilized, which are (i) plates 452 without utility fluid openings; (ii) plates 454 with utility fluid openings 456 in a first portion of the plate; and (iii) plates 455 with utility fluid openings 456 in a second portion of the plate. Each of the plates 452, 454 and 455 include gaseous openings 458 to provide a fluid passage through the stacked adsorbent contactor. For the first type of plates 452, no material is removed in the area of the utility fluid openings 456, while the second and third types of plates 454 and 455 have a portion of the material removed to form the utility fluid openings 456. Similar to the discussion above, the plates near the edge area of the absorbent contactor may not have utility fluid openings 456 to maintain integrity of the plate for handling purposes and for maintaining relative positions of the gas opening patterns.

As shown in this figure, the utility fluid openings 456 that form the utility fluid channels are made of grooves or openings that may be machined or etched on the plate surface. These grooves are made in halves, which differ for the different plates 454 and 455 (e.g., one half on one plate and the other on the adjacent plate). By matching the two openings from the plates 454 and 455, a larger flow area is provided, which may be useful for thinner plates. For thicker plates, a single groove thickness may suffice for the utility fluid channel. As an example, if the plate is about 0.4 mm thick, the utility fluid opening has thickness may be as small as 2 plates×0.4 mm thickness×0.5 (fraction of plate thickness for channel)=0.4 mm, which is generally too thin; for a utility fluid such as water. Accordingly, the utility fluid opening should have a thickness of 1 mm or larger to avoid excessive pressure drop. That is, for thinner plates, the utility fluid opening may be limited by the available design pressure drop.

The stacking of the plates may also involve different aspects to further enhance the process. For example, in one or more embodiments, two or more plates or modules may be diffusion-bonded to provide a greater thickness for the final absorbent contactor and to seal the plates together in an effective manner. The thickness of this plate or module may be determined by the wash-coating-depth limitations or other processing steps. For thicker modules or plates, equipment interconnectivity may benefit from a deeper wash-coating ability. A thicker module (e.g., 150 mm or 6 in.) may provide easier attachment of the utility fluid (e.g., water) manifolds described below.

Further still, a mechanism for aligning the different plates may also be utilized to enhance the plate configuration. That is, each plate or module may include a locator members (e.g., locator pins or the like) to align a neighboring plate or module. These locator members may include extensions or notches that provide for alignment of the openings. As such, the locator members may be assembled together in the manner that the gas openings and/or utility fluid (e.g., water) are aligned with sufficient accuracy.

As another aspect, the plates or modules may be formed in a manner that a gasket may be utilized to seal the flow of fluids through the appropriate channels. Accordingly, one or more plates, such as the top and bottom plates or certain plates, may also include a recessed gasket seating areas. The recessed gasket seating areas may be formed through high-precision milling processes, such that the plates or modules may be assembled into a leak-tight heat exchanger unit.

Figure 5:
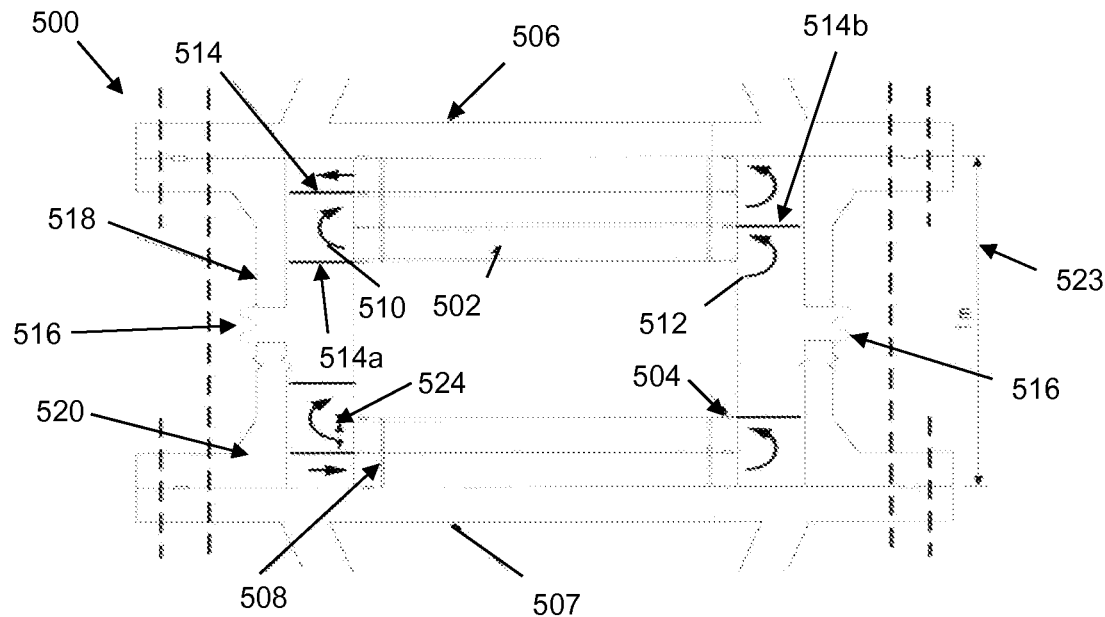
FIG. 5 hereof is a side cross-sectional view of a swing adsorption vessel having a shell to manage the flow of a utility fluid through the adsorbent contactor in accordance with an exemplary embodiment of the present techniques.

As an example, FIG. 5 hereof is a side cross-sectional view of a swing adsorption vessel 500 having shell to manage the flow of a utility fluid through the adsorbent contactor (e.g., a stack of modules 502) in accordance with an exemplary embodiment of the present techniques. In this figure, various modules 502 are provided and arranged to form a heat and mass transfer exchanger. The modules 502, which may be a single component or include various plates, are stacked along a common axis (e.g., vertically) between a first pressure plate 506 and a second pressure plate 507. The pressure plates 506 and 507 apply force on the modules 502 throughout the surface in contact with the modules 502 with the exception of any openings in the plates 506 and 507.

To compensate for thermal expansion and/or contraction, as well as to compensate for any dimensional differences that may otherwise not provide adequate leak-tightness, the swing adsorption vessel 500 may include a housing having an expansion joint 516 and a first housing section 518 and a second housing section 520. The expansion joint 516 may be disposed between the first housing section 518 and the second housing section 520 and be configured to expandable and contract along an axis, which may be substantially parallel with the stack of modules 502. The expansion joints, which are known in the art and are described by the Expansion Joints Manufacturers Association (EJMA), may be welded to the housing sections. These housing sections 518 and 520 may be utilized with the expansion joint 516 to provide a shell or barrier between locations external to an interior region formed by the housing and the plates 506 and 507. The housing may form a physical barrier for the utility fluid and/or the gaseous stream to maintain such fluid within the interior region, with the exception of provided passages. The utility fluid may enter and leave through the cylindrical walls of the housing sections 518 and/or 520 or through pressure plates 506 and/or 507. If the utility fluid stream penetrates through the cylindrical walls, baffle arrangements (not shown) should be utilized to accommodate flow into first module 502 at the bottom and at the top, respectively, for inlet and outlet.

To manage the flow of the gaseous stream through the swing adsorption vessel 500, various openings may be utilized to provide a flow path for the gaseous stream. For example, the first pressure plate 506 and a second pressure plate 507 may have machined slots (not shown) to provide a flow path for a gaseous stream through the first pressure plate 506 and a second pressure plate 507. The modules 502 may include channels 508 to provide a flow path for the gaseous stream through the modules 502. Gaskets 504 may also be disposed between the modules 502 to manage the flow of fluids between the modules 502. Overall leak tightness is achieved through the use of long bolts and nuts (not shown) across the two pressure plates 506 and 507 to apply sufficient compression of the gaskets 504.

To manage the flow of the utility fluid, gaskets 504 and baffles 514 (e.g., baffles 514a and 514b) are disposed at least partially between certain modules 502. The gaskets 504 hinder inter-mixing of gas and utility fluid within the modules 502, while the baffles 514 are utilized to manage the flow of the utility fluid through the modules, which may include a variety of different configurations. For example, the first baffle 504a may pass the utility fluid from a first module to a second module, as indicated by arrow 510. Then, the second baffle 504b may be utilized to pass the utility fluid from the second module to a third module, as indicated by arrow 512. Further, is should be noted that two types of gaskets may be utilized. These types of gaskets include: (a) the gaskets that are located between the modules as well as the top and bottom modules and the pressure plates (e.g., gaskets utilized to retain the gas within the modules), and (b) the gaskets that are located between the pressure plates and the shell girth flanges (e.g., the gaskets utilized to maintain the utility fluid within the vessel).

As a specific example, the swing adsorption vessel 500 may include diffusion bonded modules 502 formed from two or more plates, which may be formed into a stack of modules 502 that is 1 meter in height, as indicated by the dimension line 523. The modules may include gaseous openings 508 that have a diameter of 300 to 1000 micrometers and utility fluid openings (not shown) may have a height of 30 millimeters, as shown by dimension line 524. The openings may be provided along the entire edge surface of the module. Accordingly, the opening may be about 30 mm in height by about 960 mm in length. The horizontal dimension may be determined by the module size minus about 40 mm (hence, above shown 960 mm assumes a module size of 1 m (module width)×1 m (module depth)×50 mm (module height)).

This vessel may be configured to maintain a pressure up to or equal to 85 bar gauge. The vessel may be maintained within an enclosed housing to provide utility fluid flow path through the modules or may include a manifold and conduits to manage the flow of the utility fluid. As an example, the utility fluid and the gaseous stream may be operated at different pressures or pressures that are substantially similar. In particular, the pressure of the gaseous stream may vary during the different steps (e.g., within a range from 0 to 85 bar gauge (barg)), while the utility fluid may be at pressures from 0 to 10 barg (e.g., for water).

In certain embodiments, a gap (e.g., an "air gap") may be provided between two adjacent modules 502. This gap may be provided by means of spacers or the like. Such a gap may be advantageous in some embodiments to provide a region that provides mixing of the gas streams and also minimizes flow maldistributions. The gaskets 504 may be configured to maintain separate flow for the gaseous stream and the utility fluid.

Figure 6:
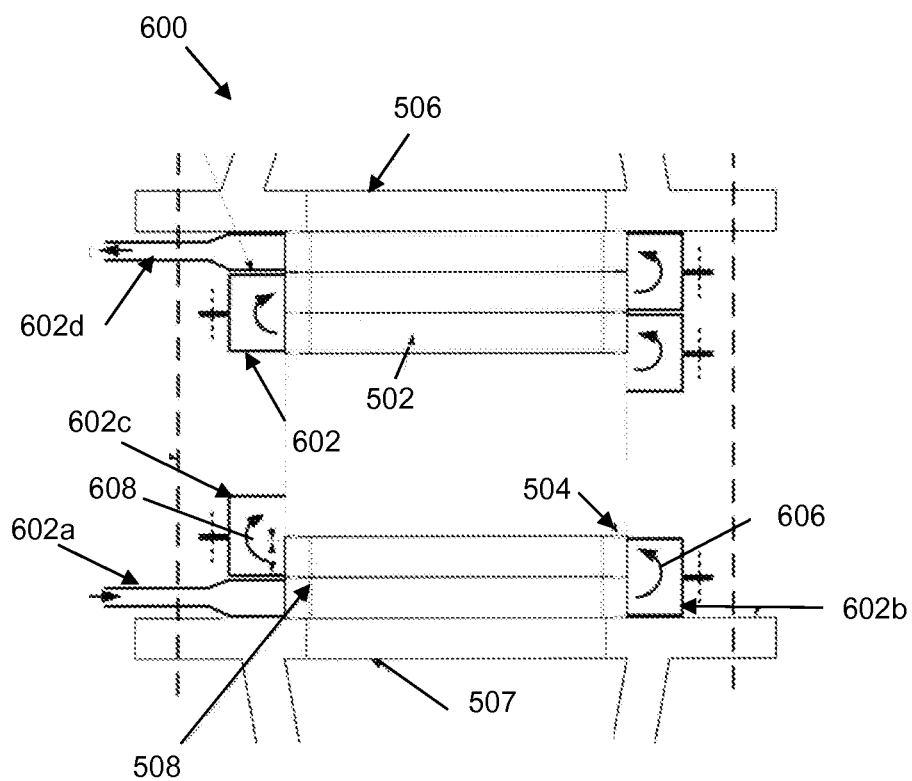
FIG. 6 hereof is a side cross-sectional view of another swing adsorption vessel having manifolds to manage the flow of a utility fluid through the adsorbent contactor in accordance with an exemplary embodiment of the present techniques.

As another example, FIG. 6 hereof is a side cross-sectional view of another swing adsorption vessel 600 in accordance with an exemplary embodiment of the present techniques. In this swing adsorption vessel 600, certain components are similar to those in the swing adsorption vessel 500, which utilize the same reference numbers. For example, the gaskets 504 and openings 508 manage the fluid flow of the gaseous stream through the pressure plates 506 and 507.

However, in this embodiment, the manifolds 602, such as manifolds 602a and 602b, for example, are utilized instead of an enclosed housing and baffles. In this embodiment, each module 502 has at least one manifold 602 that is utilized to direct the utility fluid through the module 502. For example, this embodiment include an inlet manifold 602a, an outlet manifold 602d, and various return manifolds, such as manifolds 602b and 602c, which are disposed between adjacent modules. The inlet manifold 602a is configured to provide the utility fluid to the first module, while the return manifold 602b is provided to pass the utility fluid from the first manifold to a second manifold, as indicated by arrow 606. The return manifold 602c is configured to provide to pass the utility fluid from the second manifold to a third manifold, as indicated by arrow 608. This flow continues to the outlet manifold 602d, which is configured to conduct away the utility fluid from the swing adsorption vessel 600. The manifolds 602 may be welded to the module 502 and/or the manifolds 602 may be secured to the module 502 via studs, bolts or the like. The design shown in FIG. 6 may avoid fluid leakage across baffles and provides easy access to the utility fluid manifolds for any maintenance or repairs. Further, gas leaks may be detected through the manifolds. If such gas leaks are determined, manifolds may be temporarily removed as necessary and the leaks may be repaired by plugging the utility channel involved with this leak.

Figure 7:
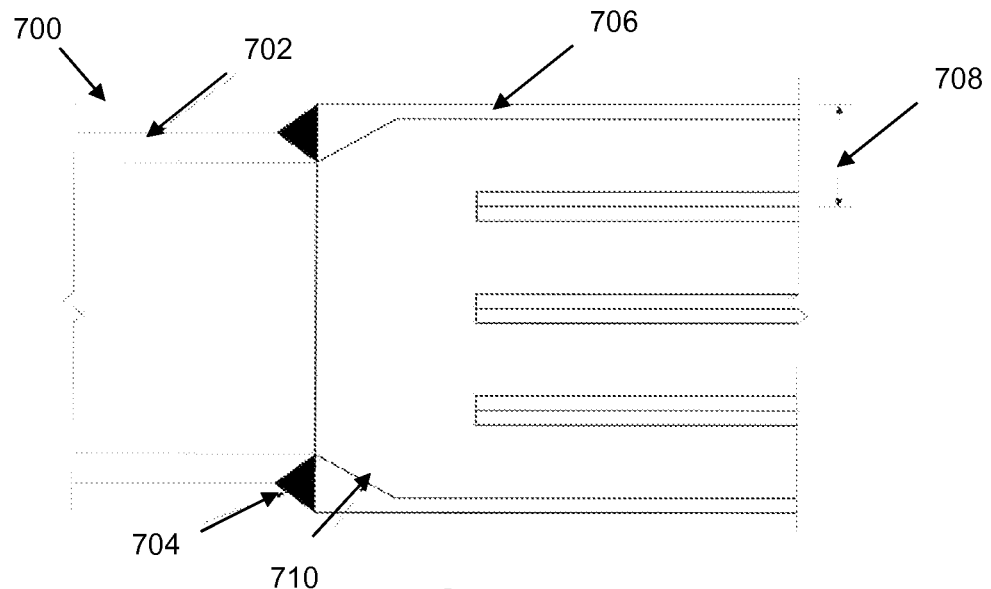
FIG. 7 hereof is a side cross-sectional view of a manifold welded to a module in accordance with an exemplary embodiment of the present techniques.

To secure the manifolds to the modules, various techniques may be utilized. In particular, the manifolds may be welded to one or more modules based on the specific configuration. As an example, FIG. 7 is a side cross-sectional view 700 of a manifold 702 welded to a module 706 in accordance with an exemplary embodiment of the present techniques. In this view 700, a manifold 702 is secured via a weld 704 to a module 706, which includes various plates, which may be formed into a sub-module 708. This weld 704 provides a secure attachment for the manifold 702 to the module 706. Non-limiting examples of techniques suitable for fixedly connecting include bonding the welds via gluing, brazing and tinning. Further, the module 706 may also include a support structure 710 that enhances the mechanical structure of the weld 704.

Figure 8:
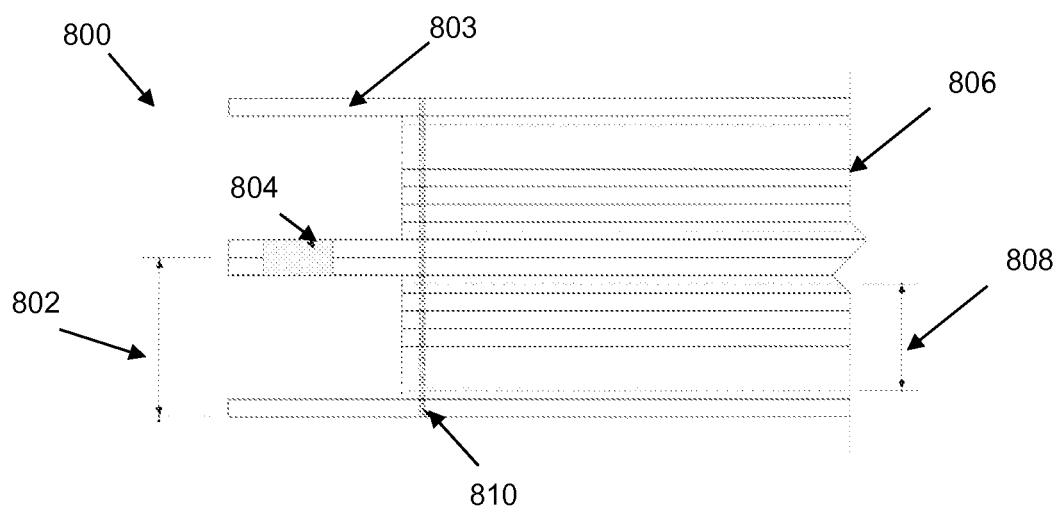
FIG. 8 hereof is a side cross-sectional view of modules welded together in accordance with an exemplary embodiment of the present techniques.

As another example, FIG. 8 is a side cross-sectional view 800 of modules 802 welded together in accordance with another exemplary embodiment of the present techniques. In this view 800, the modules 802 are stacked together and have gaseous channels, which are represented by gaseous channel 810, and have a utility fluid channel, which is represented by utility fluid channel 808. The extended plates 803 in the modules 802 are secured together via a weld 804 to reduce the gaskets utilized in the stack with other plates, such as sub-module 806, which have a shorter length than the extended plate 803. This weld 804 provides a secure attachment for the modules 802 to each other through the extended plates 803. Beneficially, this arrangement may reduce the number of gaskets in the middle portion of the adsorbent contactor. This may be overcome and decrease the number of gaskets by laser-welding of modules.

As an example, the extended plates 803 may be extended by about 25 mm (1 in.) around the outer periphery; this extension may be utilized for laser-welding to provide adequate sealing between the modules 802. The extended portion may serve as a lip seal that is formed by a variety of techniques, such as (a) using larger plates for the top and bottom regions of the module representing the lip-seal area, and/or (b) using the same size plates, but machine out the excess material leaving behind the lip seal portions. For example, in certain embodiments, the lip-seal may be removed, wash-coating may be regenerated, and lip seal re-welded thereby extending the useful life span of the modules. The weld 804 may be located at the end of the plates to minimize wastage during weld removal and re-welding.

In one or more embodiments, the swing adsorption vessel may be utilized to withstand the large forces applied to the adsorbent contactor (e.g., stack of plates or modules) during rapid cycle swing adsorption processes. Any number of contactors can be stacked together depending on the intended adsorbent bed height. The swing adsorption vessel may be useful in adsorptive kinetic separation processes, apparatus, and systems for development and production of hydrocarbons, such as gas and oil processing. Particularly, the provided processes, apparatus, and systems are useful for the rapid, large scale, efficient separation of a variety of target gases from gas mixtures.

The provided adsorbent contactors described above are useful in swing adsorption processes. Non-limiting swing adsorption processes include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

PSA processes rely on the phenomenon of gases being more readily adsorbed within the pore structure or free volume of an adsorbent material when the gas is under pressure (e.g., the higher the gas pressure, the greater the amount of gas readily-adsorbed). When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide may be selectively adsorbed by the adsorbent, and the gas exiting the vessel may be enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

Swing adsorption processes typically take place in a vessel containing one or more adsorbent beds. In multi-bed systems each bed may undergo a different step in an adsorption cycle, such as an adsorption step, one or more depressurization/desorption steps, one or more blow-down steps, and one or more repressurization steps. The flow of fluid to and from each bed is typically controlled by a valve, such as a poppet valve and/or a rotary valve assembly.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value improvements, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 vol. % $CO_2$, 4 ppm $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly beneficial as remaining gas reserves exhibit higher concentrations of acid gas, e.g., sour gas resources. Hydrocarbon feed streams vary widely in amount of acid gas, such as from several parts per million acid gas to 90 vol. % acid gas. Non-limiting examples of acid gas concentrations in natural gas from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. For these streams, the hydrocarbons may include remaining portions of the total volume of the stream.

Figure 9:
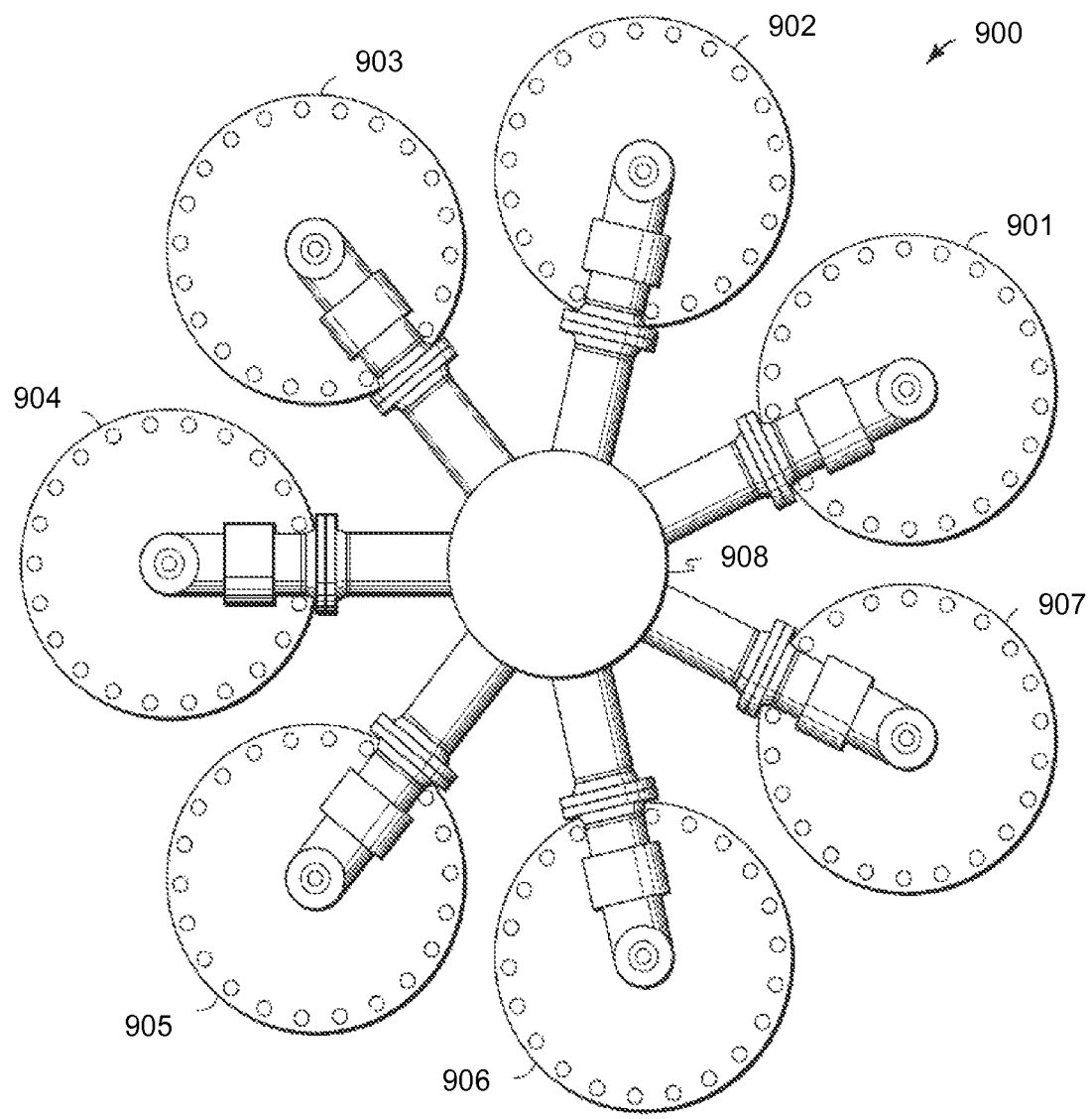
FIG. 9 is an illustration of a plan view of an exemplary hydrocarbon treating apparatus comprised of a swing adsorption system with adsorbent bed assemblies in accordance with an exemplary embodiment of the present techniques.

An exemplary hydrocarbon treating apparatus is shown in FIG. 9. This apparatus is a compact swing adsorption system 900 with seven adsorbent bed assemblies 901-907. The adsorbent bed assemblies may be stacked into layers with the top adsorbent bed assemblies 901-907 being illustrated in FIG. 9. A rotary valve assembly 908 is concentrically located in a cylindrical housing with a rotary valve, which is positioned equidistant to the enjoined adsorbent bed assemblies. The cylindrical housing further acts as a means of supporting a plurality of such adsorbent bed assemblies, conduits and valves in a multi-tier level arrangement. Gaseous streams are transferred through a given adsorbent bed by way of both the central rotary valve and one or more reciprocating valves located on the vessel heads. The gaseous stream has bi-directional travel between the ports of either of the reciprocating or rotary valves through a fixed conduit. The transfer duration of subsequent gaseous streams is limited and directed by the predetermined adsorption cycle.

As may be appreciated, various other alternative embodiments may also be possible. For example, in another embodiment the adsorbent bed assemblies may be arranged in one or more skids, each of the skids containing two or more individual adsorbent bed assemblies. Multiple reciprocating (or poppet) valves may be arranged on the top and bottom of each vessel and connected via piping and headers above and below the adsorbent bed assemblies. For each individual adsorbent bed assembly, various feed piping may pass the gaseous feed stream to the adsorbent bed assembly and the product stream may be removed via the bottom piping. The feed gas enters and exhaust gas exits through the piping and valves on the top of the vessel. Product gas exits the adsorbent vessel through one of the valves and piping systems on the bottom of the vessel. While the individual bed support structures are fixed to the skid base, the adsorbent bed assemblies, which are noted in other figures, may be disposed into the bed support structure without being rigidly attached or securely fixed. Therefore, the entire adsorbent bed assembly can move freely within the bed support structure to accommodate thermal expansion or contraction of the piping and minimize stresses on the piping and valves.

One or more of the following Concepts A-O may be utilized with the processes, apparatus, and systems, provided above, to prepare a desirable product stream while maintaining high hydrocarbon recovery;

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the absorbent that are between 20 angstroms and 10,000 angstroms (1 micron) in diameter divided by the total volume of the contactor that is occupied by the absorbent material including associated mesopores and macropores in the absorbent structure. The non-sweepable void space, hereafter referred to collectively as mesopores, can be reduced by filling the mesopores between the particles to reduce the open volume while allowing rapid gas transport throughout the adsorbent layer. This filling of the non-sweepable void space is desired to reduce to acceptable levels the quantity of desired product lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way is by filling the void space with inert solids of smaller sizes, or by filling the void space with a replenishable liquid through which the desired gases rapidly diffuse (such as water, solvents, or oil). Preferably, the void space within the adsorbent wall is reduced to less than about 40 volume percent (vol. %), preferably to less than 30 vol. %, and more preferably to less than 20 vol. %, and even more preferably to less than 10 vol. % and most preferably less than about 5 vol % of the open pore volume;

Concept D: choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety.

Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that would occur on acidic zeolites. Functionalized mesoporous adsorbents are also preferred, wherein their affinity toward hydrocarbons is further reduced compared to un-functionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4+$ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2+$). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable.

For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$, from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the removal $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a marcroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support). Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine. It is not required that the whole compound be aprotic, only that the nitrogen-containing groups in the compound be non-protogenic. Non-protogenic nitrogen species cannot donate an $H^+$ (proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine ($CH_3N(C_2H_4OH)_2$), NNN'N'-tetrakis(2-hydroxyethyl) ethylenediamine as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Compounds such as the N,N-di(lower alkyl) carboxamidines where lower alkyl is preferably $C_1$-$C_6$ alkyl, N-methyltetrahydropyrimidine (MTHP), 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing $H_2S$ and $CO_2$, from natural gas streams is cationic zeolites. Selectivity of these materials for $H_2S$ and $CO_2$ depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X).

It is preferred to use these materials for selectively removing $H_2S$ and $CO_2$ after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection. Pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent-lined channels. This structure of the contactor provides the benefits of rapid adsorption kinetics through minimization of gas film resistance and high gas-solid communication. A preferred adsorber design generates a sharp adsorption front.

It is preferred to have very rapid gas to adsorbent kinetics, i.e. the length through which the target species (e.g., target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing parallel channel contactors wherein the feed and purge gases are confined to a plurality of very narrow (1000 to 30 micron diameter) open channels that are lined to an effective thickness of the adsorbent material.

The term, "effective thicknesses", means a range of about 500 microns to 5 microns for most applications. In the most limiting case of laminar gas flow, the very narrow channels limit the maximum diffusion distance for a trace species to no more than half the diameter of the channel. Even when adsorbing the desired species at the leading edge of the adsorption front, where their concentrations approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design;

Concept N: a means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

The term, "internal temperature control", means the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system would be the use of supported amines on a water stable support with the use of hot and cold water (pressurized liquid or used as steam for heating) for heating and cooling. Whereas liquid water may be left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine. Following the desorption step, $H_2S$ and $CO_2$ can be easily separated using distillation or other methods known to those skilled in the art.

The term, "external temperature control", means an adsorbent bed structure where the heating and cooling fluid is kept from contact with the gas-carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns. A non-limiting example of such an external temperature control bed design would be the use of hollow fibers with a fluid impermeable barrier layer on the outer diameter wherein the hollow fibers are comprised of a mixed matrix system of polymeric and supported amine adsorbents. Feed gas would be passed through the inner diameter of the porous fiber to be adsorbed by the adsorbent at lower temperatures, while cool temperature control fluid is flowing over the fibers outer diameters. Desorption would be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system would be such that a sharp temperature gradient in the temperature control fluid would be established during heating and cooling such that the sensible heat of the system can be recuperated within the adsorbent bed structure. For such a non-limiting hollow fiber example, the useful fiber outer diameter dimension is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In some embodiments, it is advantageous to keep the ratio of non-adsorbing thermal mass in the adsorbent bed to adsorbent as low as possible. This ratio is preferably be less than 20, more preferably less than 10, and most preferred less than 5. In this manner, the sensible heat of the system that is swung in each cycle may be kept to a minimum;

Concept O: A relatively low flow of about 0.01 to 5 vol. % of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there is no breakthrough of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels (i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ are rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this allows more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Swing adsorption processes are all well known to those having ordinary skill in the art and they can be applied to remove a variety of target gases from a wide variety of gas mixtures. It is possible to significantly improve the recovery percentage of the light component of a gas mixture by use of the present invention. The "light component" as utilized herein is taken to be the species, or molecular component, or components that are not preferentially taken up by the adsorbent in the adsorption step of the process. Conversely, the "heavy component" as utilized herein is taken to be the species, or molecular component, or components that are preferentially taken up by the adsorbent in the adsorption step of the process. The total recovery of the light component achieved in the swing adsorption process can be greater than about 80 vol. %, more preferably greater than about 85 vol. %, even more preferably greater than about 90 vol. %, and most preferably greater than about 95 vol. % of the content of the light component introduced into the process. Recovery of the light component is defined as the time averaged molar flow rate of the light component in the product stream divided by the time averaged molar flow rate of the light component in the feedstream. Similarly, recovery of the heavy component is defined as the time averaged molar flow rate of the heavy component in the product stream divided by the time averaged molar flow rate of the heavy component in the feedstream.

The adsorbent contactors of the present disclosure may also contain a very low volume fraction of open mesopores and macropores. That is, the structured bed adsorbent contactors of the present invention contain less than about 20 vol. %, preferably less than about 15 vol. %, more preferably less than about 10 vol. %, and most preferably less than about 5 vol. % of their pore volume in open pores in the mesopore and macropore size range. Mesopores are defined by the IUPAC to be pores with sizes in the 20 to 500 angstrom size range. Macropores are defined herein to be pores with sizes greater than 500 angstroms and less than 1 micron. Because the flow channels are larger than 1 micron in size, they are not considered to be part of the macropore volume. By open pores we mean mesopores and macropores that are not occupied by a blocking agent and that are capable of being occupied, essentially non-selectively, by components of a gas mixture. Different test methods as described below are to be used to measure the volume fraction of open pores in a contactor depending on the structure of the contactor.

Open pore volume (in percent or volume percent) is defined herein as the volume of the pores in the adsorbent that are between 20 angstroms and 10,000 angstroms (1 micron) in diameter divided by the total volume of the contactor that is occupied by the adsorbent material including associated mesopores and macropores in the adsorbent structure. "Swept volumes" such as engineering flow channels as well as the volume occupied by any non-adsorbent material, such as but not limited to, support materials, blocking agents, thermal masses, etc., are not included in the amount of volume occupied by the adsorbent material.

Additional embodiments 1 to 35 are provided as follows:
1. A method of fabricating an adsorbent contactor, comprising:
   obtaining two or more plates, wherein each of the two or more plates have a plurality of gaseous openings and at least one utility fluid opening;
   aligning the two or more plates, wherein the plurality of gaseous openings are substantially oriented along a common axis for each of the plurality of gaseous openings;
   diffusion bonding the aligned plates to form a module; and
   wash coating the plurality of gaseous openings within the module with an adsorbent material.
2. The method of paragraph 1, further comprising photochemical etching the two or more plates to form the plurality of gaseous openings.
3. The method of any one of paragraphs 1 to 2, wherein diffusion bonding involves applying a substantial and uniform pressure across the plates inside an oven heated to approximately 70% of the melting point of the plate material.
4. The method of any one of paragraphs 1 to 3, comprising repeating the method to provide another module and stacking the modules, wherein the plurality of gaseous openings of each of the modules are substantially oriented along the common axis for each of the plurality of gaseous openings.
5. The method of paragraph 4, further comprising forming a seal mechanism for the stack of modules.
6. The method of paragraph 5, further comprising machining each of the modules to form at least one groove; and disposing a gasket in the at least one groove.
7. The method of paragraph 5, further comprising laser welding the modules into the stack of modules.
8. The method of any one of paragraphs 1 to 7, further comprising cleaning the module with a high-pressure jet of air, nitrogen, or steam to remove contaminants from the plurality of gaseous openings prior to the wash coating.
9. The method of any one of paragraphs 1 to 8, wherein the plurality of gaseous openings of the module are substantially oriented along the common axis that is in a direction perpendicular to the diffusion-bonded interfaces between the two or more plates.
10. The method of any one of paragraphs 1 to 8, wherein the at least one utility fluid opening of the module are substantially oriented along the common axis that is in a direction parallel to the diffusion-bonded interfaces between the two or more plates.
11. The method of any one of paragraphs 1 to 10, wherein the module has a high area density in the range of 1200 to 4000 $m^2/m^3$.
12. The method of any one of paragraphs 1 to 10, wherein the module has a high area density in the range of 1500 to 3500 $m^2/m^3$.
13. The method of any one of paragraphs 1 to 10, wherein the module has a high area density in the range of 2000 to 3000 $m^2/m^3$.
14. The method of any one of paragraphs 1 to 10, wherein the module has a thickness in the range of 20 mm to 200 mm.
15. A method of fabricating a swing adsorption vessel, comprising:
   obtaining two or more plates, wherein each of the two or more plates have a plurality of gaseous openings and at least one utility fluid opening;
   aligning the two or more plates, wherein the plurality of gaseous openings are substantially oriented along a common axis for each opening;
   diffusion bonding the aligned plates to form a module; and
   wash coating the plurality of gaseous openings within the module with an adsorbent material; and
   disposing the module within a housing.
16. The method of paragraph 15, further comprising photochemical etching the two or more plates to form the plurality of gaseous openings.
17. The method of any one of paragraphs 15 to 16, wherein diffusion bonding involves applying a substantial and uniform pressure across the plates inside an oven heated to approximately 70% of the melting point of the plate material.
18. The method of any one of paragraphs 15 to 17, comprising repeating the method to provide another module and stacking the modules, wherein the plurality of gaseous openings of each of the modules are substantially oriented along the common axis for each opening.
19. The method of paragraph 18, further comprising forming a seal mechanism for the stack of modules.
20. The method of paragraph 19, further comprising machining each of the modules to form at least one groove; and disposing a gasket in the at least one groove.
21. The method of paragraph 19, further comprising laser welding the modules into the stack of modules.
22. The method of any one of paragraphs 15 to 21 further comprising cleaning the module with a high-pressure jet of air or nitrogen or steam to remove contaminants from the plurality of gaseous openings prior to the wash coating.
23. The method of any one of paragraphs 15 to 22, wherein the plurality of gaseous openings of the module are substantially oriented along the common axis that is in a direction perpendicular to the diffusion-bonded interfaces between the two or more plates.
24. The method of any one of paragraphs 15 to 22, wherein the at least one utility fluid opening of the module is substantially oriented along the common axis that is in a direction parallel to the diffusion-bonded interfaces between the two or more plates.
25. The method of any one of paragraphs 15 to 24, further comprising combining equipment with the adsorption contactor to form the swing adsorption vessel.
26. The method of any one of paragraphs 15 to 25, wherein combining equipment with the adsorption contactor further comprises securing one or more baffles between at least one of the modules to manage the flow path of the utility fluid through the modules.
27. The method of any one of paragraphs 15 to 25, wherein combining equipment with the adsorption contactor further comprises securing one or more manifolds between at least one of the modules to manage the flow path of the utility fluid through the modules.
28. The method of any one of paragraphs 15 to 27, wherein combining equipment with the adsorption contactor further comprises securing one or more baffle arrangements to an inlet nozzle and an outlet nozzle, respectively, to provide a utility fluid flow path into one module and out of the one module or another module.
29. The method of any one of paragraphs 15 to 28, wherein the adsorbent contactor comprises five to fifty modules.
30. The method of any one of paragraphs 15 to 28, wherein the adsorbent contactor comprises ten to twenty modules.
31. A method of processing a gaseous stream to remove contaminants, comprising:
   a) passing a gaseous stream through the swing adsorption vessel to remove contaminants from the gaseous stream, wherein the swing adsorption vessel has a plurality of stacked modules having a plurality of gaseous openings with an adsorbent material disposed within the plurality of gaseous openings and configured to adsorb at least a portion of the contaminants in the gaseous stream, and wherein each module is formed from two or more plates that are diffusion bonded together;
   b) passing a utility fluid through a swing adsorption vessel, wherein the plurality of stacked modules have at least one utility fluid opening and wherein the utility fluid and the gaseous stream are maintained separate from each other;
   c) stopping the flow of the gaseous stream through the swing adsorption vessel; and
   d) performing one or more of a depressurization step, a blow-down step, and a repressurization step.
32. The method of paragraph 31, further comprising:
   e) determining whether production is complete;
   f) if production is not complete; repeating steps a) to e); and
   g) if production is complete, regenerating the adsorbent material in the swing adsorption vessel.
33. The method of paragraph 32, wherein regenerating the adsorbent material in the swing adsorption vessel comprising:
   i) removing the swing adsorption vessel from operation;
   ii) removing the adsorbent contactor from the swing adsorption vessel;
   iii) separating the plurality of stacked modules;
   iv) removing the adsorbent material from each of the modules;
   v) disposing adsorbent material within the plurality of gaseous openings; and
   vi) reassembling the plurality of stacked modules into the swing adsorption vessel.
34. The method of paragraph 33, wherein removing the adsorbent material from each of the modules comprises applying a high-pressure steam toward the gaseous opening.

35. The method of paragraph 34, wherein separating the plurality of stacked modules comprises removing the laser welded portion of modules secured together.

In view of the many possible embodiments to which the principles of the disclosed invention may be applied, it should be recognized that the illustrative embodiments are only preferred examples of the invention and should not be taken as limiting the scope of the invention.

What is claimed is:

1. A method of fabricating an adsorbent contactor, comprising:
  obtaining two or more plates, wherein each of the two or more plates have a plurality of gaseous openings and at least one utility fluid opening;
  aligning the two or more plates, wherein the plurality of gaseous openings are substantially oriented along a common axis for each of the plurality of gaseous openings;
  diffusion bonding the aligned plates to form a module; and
  wash coating the plurality of gaseous openings within the module with an adsorbent material.

2. The method of claim 1, further comprising photo-chemical etching the two or more plates to form the plurality of gaseous openings.

3. The method of claim 1, wherein diffusion bonding involves applying a substantial and uniform pressure across the plates inside an oven heated to approximately 70% of the melting point of the plate material.

4. The method of claim 1, comprising repeating the method to provide another module and stacking the modules, wherein the plurality of gaseous openings of each of the modules are substantially oriented along the common axis for each of the plurality of gaseous openings.

5. The method of claim 4, further comprising forming a seal mechanism for the stack of modules.

6. The method of claim 5, further comprising machining each of the modules to form at least one groove; and disposing a gasket in the at least one groove.

7. The method of claim 5, further comprising laser welding the modules into the stack of modules.

8. The method of claim 1, further comprising cleaning the module with a high-pressure jet of air, nitrogen, or steam to remove contaminants from the plurality of gaseous openings prior to the wash coating.

9. The method of claim 1, wherein the plurality of gaseous openings of the module are substantially oriented along the common axis that is in a direction perpendicular to the diffusion-bonded interfaces between the two or more plates.

10. The method of claim 1, wherein the at least one utility fluid opening of the module are substantially oriented along the common axis that is in a direction parallel to the diffusion-bonded interfaces between the two or more plates.

11. The method of claim 1, wherein the module has a high area density in the range of 1500 to 3500 $m^2/m^3$.

12. The method of claim 1, wherein the module has a thickness in the range of 20 mm to 200 mm.

13. A method of fabricating a swing adsorption vessel, comprising:
  obtaining two or more plates, wherein each of the two or more plates have a plurality of gaseous openings and at least one utility fluid opening;
  aligning the two or more plates, wherein the plurality of gaseous openings are substantially oriented along a common axis for each opening;
  diffusion bonding the aligned plates to form a module; and
  wash coating the plurality of gaseous openings within the module with an adsorbent material; and
  disposing the module within a housing.

14. The method of claim 13, further comprising photo-chemical etching the two or more plates to form the plurality of gaseous openings.

15. The method of claim 13, wherein diffusion bonding involves applying a substantial and uniform pressure across the plates inside an oven heated to approximately 70% of the melting point of the plate material.

16. The method of claim 13, comprising repeating the method to provide another module and stacking the modules, wherein the plurality of gaseous openings of each of the modules are substantially oriented along the common axis for each opening.

17. The method of claim 16, further comprising forming a seal mechanism for the stack of modules.

18. The method of claim 17, further comprising machining each of the modules to form at least one groove; and disposing a gasket in the at least one groove.

19. The method of claim 17, further comprising laser welding the modules into the stack of modules.

20. The method of claim 13, wherein the plurality of gaseous openings of the module are substantially oriented along the common axis that is in a direction perpendicular to the diffusion-bonded interfaces between the two or more plates.

21. The method of claim 13, wherein the at least one utility fluid opening of the module is substantially oriented along the common axis that is in a direction parallel to the diffusion-bonded interfaces between the two or more plates.

22. The method of claim 13, further comprising securing one or more baffles between at least one of the modules to manage the flow path of the utility fluid through the modules.

23. The method of claim 13, further comprising securing one or more manifolds between at least one of the modules to manage the flow path of the utility fluid through the modules.

24. The method of claim 13, further comprising securing one or more baffle arrangements to an inlet nozzle and an outlet nozzle, respectively, to provide a utility fluid flow path into one module and out of the one module or another module.

25. A method of processing a gaseous stream to remove contaminants, comprising:
  a) passing a gaseous stream through a swing adsorption vessel to remove contaminants from the gaseous stream, wherein the swing adsorption vessel has a plurality of stacked modules having a plurality of gaseous openings with an adsorbent material disposed within the plurality of gaseous openings and configured to adsorb at least a portion of the contaminants in the gaseous stream, and wherein each module is formed from two or more plates that are diffusion bonded together;
  b) passing a utility fluid through the swing adsorption vessel, wherein the plurality of stacked modules have at least one utility fluid opening and wherein the utility fluid and the gaseous stream are maintained separate from each other;
  c) stopping the flow of the gaseous stream through the swing adsorption vessel; and
  d) performing one or more of a depressurization step, a blow-down step, and a repressurization step.

26. The method of claim 25, further comprising:
  e) determining whether production is complete;
  f) if production is not complete; repeating steps a) to e); and
  g) if production is complete, regenerating the adsorbent material in the swing adsorption vessel.

27. The method of claim 26, wherein regenerating the adsorbent material in the swing adsorption vessel comprises:
  i) removing the swing adsorption vessel from operation;
  ii) removing the plurality of stacked modules from the swing adsorption vessel;
  iii) separating the plurality of stacked modules;
  iv) removing the adsorbent material from each of the modules;
  v) disposing adsorbent material within the plurality of gaseous openings; and
  vi) reassembling the plurality of stacked modules into the swing adsorption vessel.

28. The method of claim 27, wherein removing the adsorbent material from each of the modules comprises applying a high-pressure steam toward the gaseous opening.

29. The method of claim 28, wherein separating the plurality of stacked modules comprises removing the laser welded portion of modules secured together.

\* \* \* \* \*